(12) United States Patent
Wright et al.

(10) Patent No.: US 9,411,462 B2
(45) Date of Patent: *Aug. 9, 2016

(54) CAPACITIVE STYLUS FOR A TOUCH SCREEN

(71) Applicant: Parade Technologies, Ltd., Santa Clara, CA (US)

(72) Inventors: David G. Wright, Woodinville, WA (US); Darrin Vallis, Austin, TX (US)

(73) Assignee: PARADE TECHNOLOGIES, LTD., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/947,596

(22) Filed: Jul. 22, 2013

(65) Prior Publication Data

US 2014/0085257 A1 Mar. 27, 2014

Related U.S. Application Data

(63) Continuation of application No. 13/214,048, filed on Aug. 19, 2011, now Pat. No. 8,493,359.

(60) Provisional application No. 61/385,463, filed on Sep. 22, 2010.

(51) Int. Cl.
*G06F 3/044* (2006.01)
*G06F 3/033* (2013.01)
*G06F 3/041* (2006.01)
(Continued)

(52) U.S. Cl.
CPC .............. *G06F 3/0416* (2013.01); *G06F 3/038* (2013.01); *G06F 3/03545* (2013.01); *G06F 3/044* (2013.01)

(58) Field of Classification Search
CPC . G06F 3/03545; G06F 3/044; G06F 3/03542; G06F 3/038; G06F 3/0383; G06F 3/0386; G06F 3/041; G06F 2203/04104; G06F 2203/04106
USPC ............ 345/173–179, 104; 178/18.01–18.09, 178/18.11, 19.01–19.07
See application file for complete search history.

(56) References Cited

U.S. PATENT DOCUMENTS

| 4,273,958 A | 6/1981 | Hirata |
| 5,149,919 A | 9/1992 | Greanias et al. |
| 6,002,387 A | 12/1999 | Ronkka et al. |

(Continued)

FOREIGN PATENT DOCUMENTS

| CN | 1679078 A | 10/2005 |
| JP | 2002297300 A | 10/2002 |

(Continued)

OTHER PUBLICATIONS

International Search Report for International Application No. PCT/US11/45687 dated Feb. 17, 2012; 3 pages.

(Continued)

*Primary Examiner* — Stephen Sherman
(74) *Attorney, Agent, or Firm* — Morgan, Lewis & Bockius LLP

(57) ABSTRACT

A stylus having a transmit drive circuit configured to transmit a signal to a capacitance sensor via capacitive coupling between the stylus and a capacitive sense array which is coupled to the capacitance sensor, which is configured to synchronize to the stylus, the stylus being configured to act as a timing master.

17 Claims, 11 Drawing Sheets

(51) Int. Cl.
*G06F 3/0354* (2013.01)
*G06F 3/038* (2013.01)

(56) References Cited

U.S. PATENT DOCUMENTS

| | | | |
|---|---|---|---|
| 6,009,317 | A | 12/1999 | Wynn |
| 6,081,261 | A | 6/2000 | Wolff et al. |
| 6,198,360 | B1 | 3/2001 | Henrion |
| 6,441,810 | B1 | 8/2002 | Skoog et al. |
| 6,690,156 | B1 | 2/2004 | Weiner et al. |
| 7,292,229 | B2 | 11/2007 | Morag et al. |
| 7,406,393 | B2 | 7/2008 | Ely et al. |
| 8,481,872 | B2 * | 7/2013 | Zachut ............ 178/18.03 |
| 2004/0095333 | A1 | 5/2004 | Morag et al. |
| 2005/0162411 | A1 | 7/2005 | van |
| 2006/0012581 | A1 | 1/2006 | Haim et al. |
| 2007/0171211 | A1 | 7/2007 | Perski et al. |
| 2007/0177533 | A1 * | 8/2007 | Palay et al. ............ 370/295 |
| 2008/0001078 | A1 * | 1/2008 | Pittel et al. ............ 250/252.1 |
| 2008/0001925 | A1 | 1/2008 | Xiaoping |
| 2008/0055279 | A1 | 3/2008 | Osada et al. |
| 2008/0150917 | A1 | 6/2008 | Libbey et al. |
| 2008/0156546 | A1 | 7/2008 | Hauck |
| 2008/0158165 | A1 | 7/2008 | Geaghan et al. |
| 2009/0127003 | A1 | 5/2009 | Geaghan |
| 2010/0066693 | A1 | 3/2010 | Sato et al. |
| 2010/0085325 | A1 | 4/2010 | King-Smith |
| 2010/0155153 | A1 | 6/2010 | Zachut |
| 2010/0170726 | A1 | 7/2010 | Yeh et al. |
| 2010/0181180 | A1 | 7/2010 | Peter |
| 2010/0252335 | A1 | 10/2010 | Orsley |
| 2011/0122087 | A1 | 5/2011 | Jang et al. |
| 2012/0050207 | A1 | 3/2012 | Westhues et al. |
| 2012/0062499 | A1 | 3/2012 | Weaver et al. |

FOREIGN PATENT DOCUMENTS

| | | |
|---|---|---|
| JP | 2003263274 A | 3/2003 |
| JP | 2003263274 A | 9/2003 |

OTHER PUBLICATIONS

USPTO Non-Final Rejection for Application No. 13/214,048 dated Feb. 15, 2013; 14 pages.
USPTO Notice of Allowance for Application No. 13/214,048 dated May 29, 2013; 6 pages.
Written Opinion of the International Searching Authority for International Application No. PCT/US11/45687 mailed Feb. 17, 2012; 4 pages.
International Search Report for International Application No. PCT/US12/47308 dated Aug. 17, 2012; 2 pages.
Jonathan Hill, Devdas Shetty and Jun Kondo_Smart Sensor Instrumentation Development Example Including the New Paradigm of an FPGA Based System_Dated 2007_13 pages.
Roger A. Green_Quadrature Receiver Mismatch Calibration_Dated Nov. 1999_4 pages.
USPTO Final Rejection for U.S. Appl. No. 13/434,571 dated Aug. 30, 2012; 17 pages.
USPTO Non-Final Rejection for Application No. 13/434,571 dated May 31, 2012; 18 pages.
USPTO Notice of Allowance for Application No. 13/434,571 dated Oct. 9, 2012; 5 pages.
Written Opinion of the International Searching Authority for International Application No. PCT/US12/47308 mailed Aug. 17, 2012; 3 pages.
Cypress Semiconductor Co., ISRWO, PCTUS2011/045661, Feb. 17, 2012, 7 pgs.
Cypress Semiconductor Co., ISRWO, PCTUS2011/045675, Feb. 17, 2012, 7pgs.
Cypress Semiconductor Co., ISRWO, PCTUS2011/045687, Feb. 17, 2012, 7 pgs.
Kremin, Office Action, U.S. Appl. No. 13/213,895, Oct. 9, 2012, 15 pgs.
Kremin, Final Office Action, U.S. Appl. No. 13/213,895, Mar. 14, 2013, 17 pgs.
Kremin, Office Action, U.S. Appl. No. 13/213,895, Jul. 18, 2013, 19 pgs.
Kremin, Final Office Action, U.S. Appl. No. 13/213,895, Oct. 3, 2013, 23 pgs.
Kremin, Office Action, U.S. Appl. No. 13/213,895, Feb. 19, 2014, 21 pgs.
Kremin, Final Office Action, U.S. Appl. No. 13/213,895, Apr. 22, 2014, 24 pgs.
Kremin, Office Action, U.S. Appl. No. 13/213,895, Jul. 29, 2014, 23 pgs.
Kremin, Final Office Action, U.S. Appl. No. 13/213,895, Oct. 14, 2014, 24 pgs.
Kremin, Office Action, U.S. Appl. No. 13/213,895, Mar. 6, 2015, 24 pgs.
Kremin, Final Office Action, U.S. Appl. No. 13/213,895, May 27, 2015, 27 pgs.
Kremin, Office Action, U.S. Appl. No. 13/213,981, Oct. 2, 2012, 14 pgs.
Kremin, Final Office Action, U.S. Appl. No. 13/213,981, Mar. 14, 2013, 16 pgs.
Kremin, Office Action, U.S. Appl. No. 13/213,981, Sep. 12, 2013, 18 pgs.
Kremin, Final Office Action, U.S. Appl. No. 13/213,981, Nov. 25, 2013, 18 pgs.
Kremin, Office Action, U.S. Appl. No. 13/213,981, Feb. 27, 2014, 19 pgs.
Kremin, Final Office Action, U.S. Appl. No. 13/213,981, May 2, 2014, 20 pgs.
Kremin, Office Action, U.S. Appl. No. 13/213,981, Jul. 31, 2014, 20 pgs.
Kremin, Final Office Action, U.S. Appl. No. 13/213,981, Oct. 8, 2014, 22 pgs.
Kremin, Office Action, U.S. Appl. No. 13/214,048, Feb. 15, 2013, 14 pgs.
Kremin, Notice of Allowance, U.S. Appl. No. 13/214,048, May 29, 2013, 6 pgs.
Office Action, CN 201180002763.4, Jul. 24, 2015, 15 pgs.
Kremin, Office Action, U.S. Appl. No. 13/213,895, Dec. 10, 2015, 24 pgs.
Office Action, CN 201180002771.9, Nov. 2, 2015, 7 pgs.
Kremin, Final Office Action, U.S. Appl. No. 13/213,895, Mar. 23, 2016, 16 pgs.

* cited by examiner

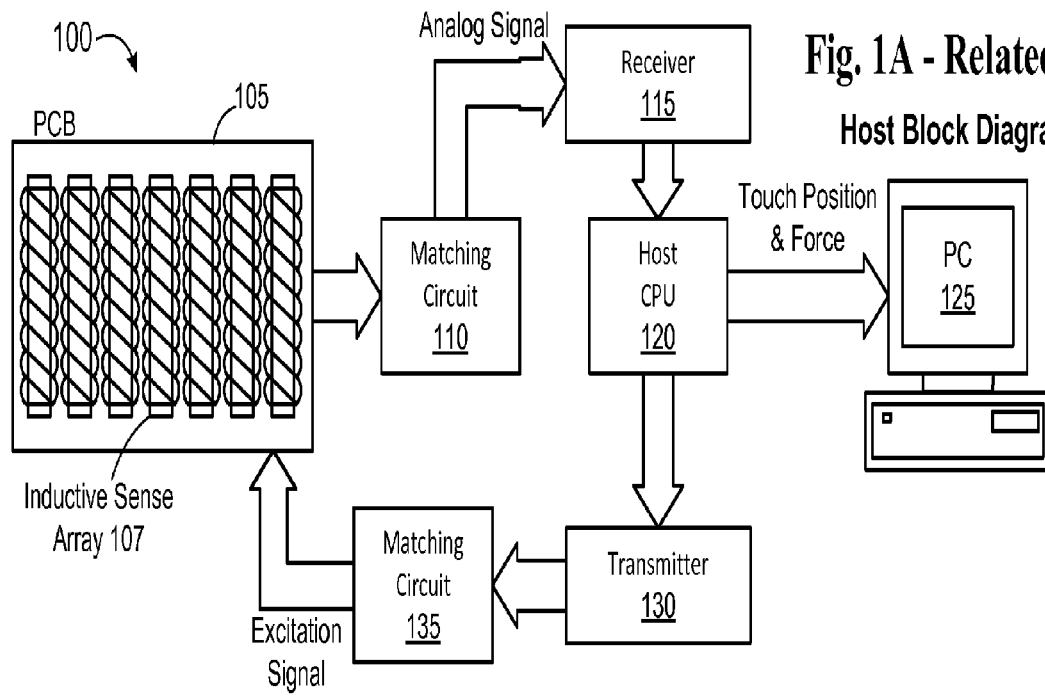
Fig. 1A - Related Art
Host Block Diagram
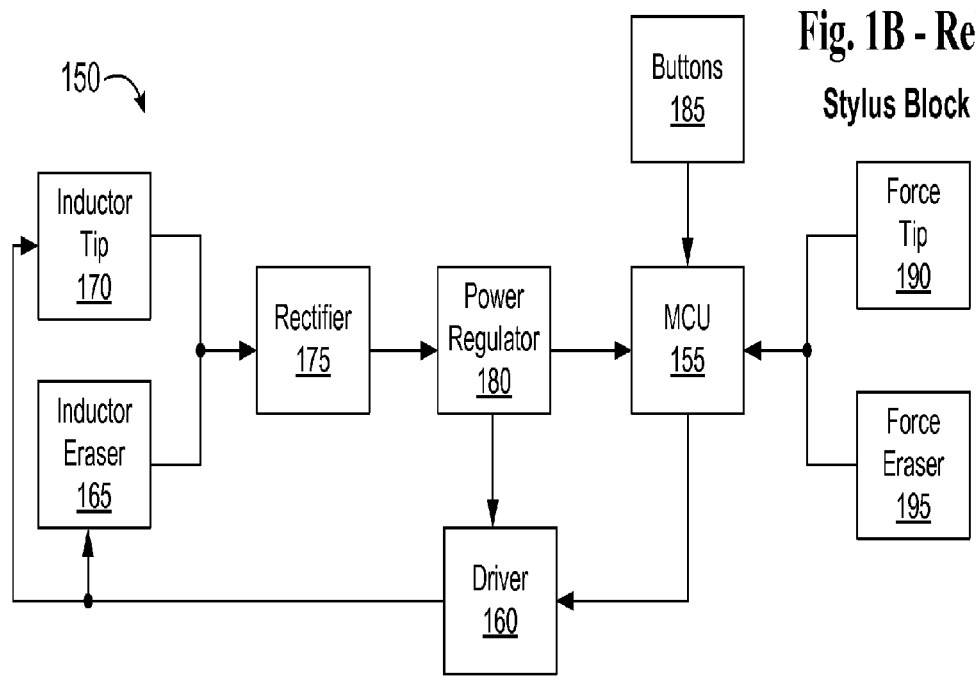
Fig. 1B - Related Art
Stylus Block Diagram

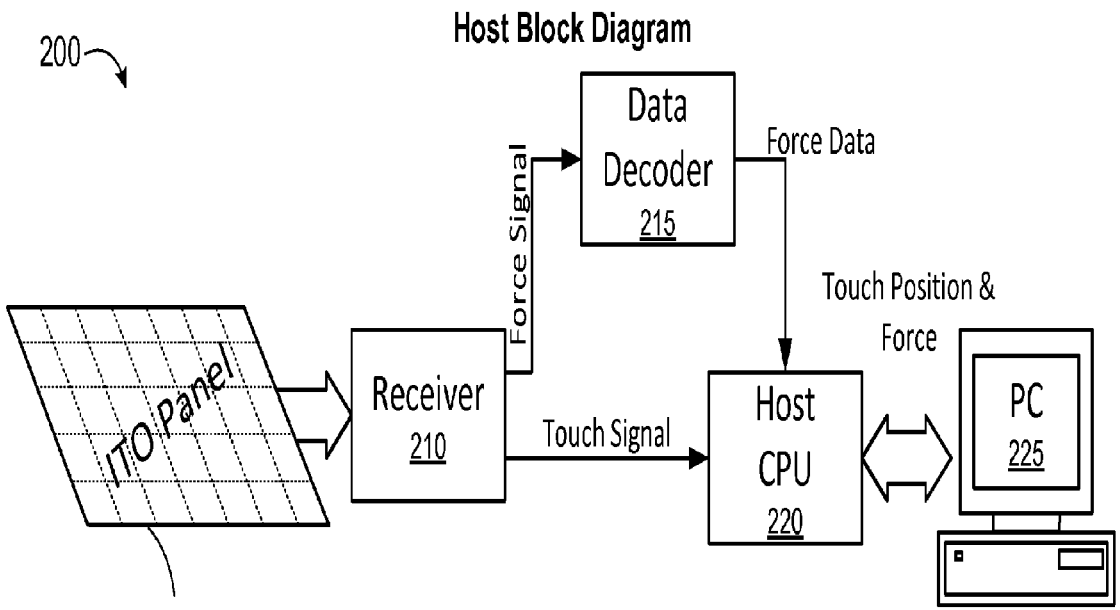
Fig. 2A - Related Art
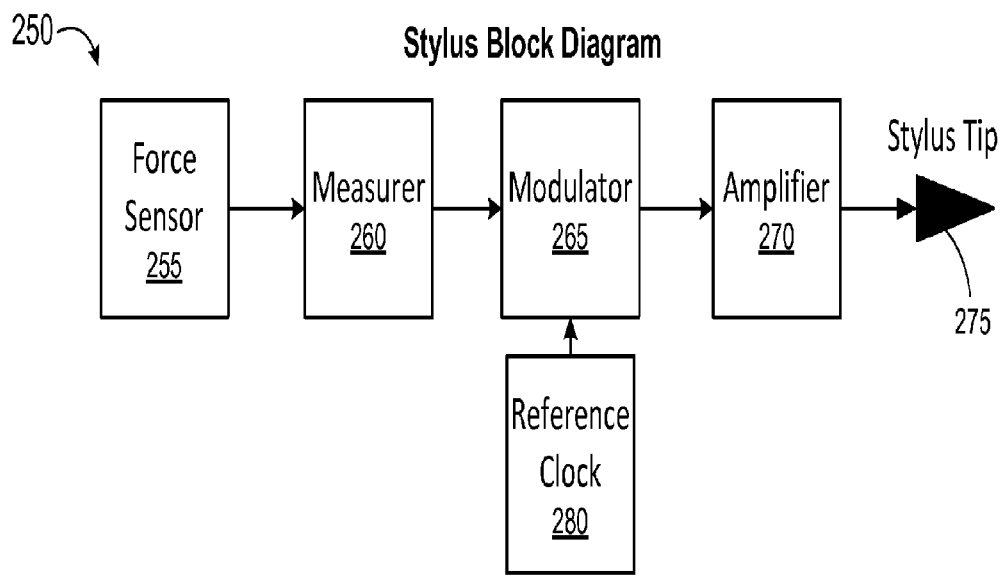
Fig. 2B - Related Art

CAPACITIVE STYLUS FOR A TOUCH SCREEN

RELATED APPLICATION

This application is a continuation of U.S. patent application Ser. No. 13/214,048, filed Aug. 19, 2011, which claims the benefit of U.S. Provisional Patent Application 61/385,463, filed Sep. 22, 2010, all of which are incorporated by reference herein in their entirety. This application is related to co-pending U.S. patent application Ser. No. 13/213,895, filed Aug. 19, 2011, and co-pending U.S. patent application Ser. No. 13/213,981, filed Aug. 19, 2011.

TECHNICAL FIELD

This disclosure relates to the field of user interface devices and, in particular, to capacitive sensor devices.

BACKGROUND

The use of a stylus with a touch screen interface is well established. Touch screen designs have incorporated many different technologies including resistive, capacitive, inductive, and radio frequency sensing arrays. Resistive touch screens, for example, are passive devices well suited for use with a passive stylus. The original PalmPilots® devices from the mid-1990s were one of the first successful commercial devices to utilize a resistive touch screen designed for use with a stylus and helped to popularize that technology. Although resistive touch screens can sense the input from nearly any object, multi-touch is generally not supported. An example of a multi-touch application may be applying two or more fingers to the touch screen. Another example may be inputting a signature, which may include simultaneous palm and stylus input signals. Due to these and other numerous disadvantages, capacitive touch screens are increasingly replacing resistive touch screens in the consumer marketplace.

Various tethered active stylus approaches have been implemented for use with touch screens and are found in many consumer applications such as point-of-sale terminals (e.g., the signature pad used for credit card transactions in retail stores) and other public uses. However, the need for a tethered cable is a significant drawback for private applications such as personal computers ("PCs"), smart phones, and tablet PCs.

FIG. 1A is a block diagram illustrating a conventional embodiment of a host device 100 for tracking the position of a touch object on an inductive sense array 107. The host device 100 includes a printed circuit board ("PCB") 105, a first matching circuit 110, a receiver 115, a host central processing unit ("CPU") 120, a personal computer ("PC") 125, a transmitter 130, and a second matching circuit 135. The PCB 105 is typically placed behind a touch screen (not shown) and includes an inductive sense array 107. The inductive sense array 107 includes a series of inductive coils. Inductive sense arrays are typically heavy and expensive to manufacture.

FIG. 1B is a block diagram illustrating a conventional embodiment of an active stylus 150 used in a system for tracking the position of a touch object on an inductive sense array 107. The stylus 150 includes a micro-controller unit ("MCU") 155, a driver 160, and inductor eraser 165, and inductor tip 170, a rectifier 175, a power regulator 180, a button(s) 185, a force tip 190, and a force eraser 195. The inductor eraser 165 and inductor tip 170 are configured on different stylus edges.

In operation, the inductive sense array 107 on PCB 105 generates a magnetic field to provide both stylus power generation and touch position detection. Regarding touch position, the matching circuit 110 provides impedance matching and couples the stylus 150 signal from the inductive sense array 107 to the receiver 115. The receiver 115 and host CPU 120 receives and process the analog signal, respectively, providing touch position and force data to the PC 125. Force data is indicative of the amount of pressure provided by the stylus tip to the touch screen. The host CPU 120 calculates the touch position based on the relative inductor signal strength of each coil of the inductive sense array 107. More specifically, the presence of the stylus 150 changes the individual inductor currents for each coil in the inductive sense array 107 based on their relative proximity to the stylus. The maximum signal strength approximates the stylus 150 touch position on the accompanying touch screen.

The host CPU 120 sends a high frequency carrier signal to the stylus 150 via an amplifier (not shown), a transmitter 130, an impedance matching circuit 135, and the inductive sense array 107. The stylus 150 receives and utilizes the high frequency carrier signal for self-powering and data transmission. In operation, the stylus 150 rectifies (rectifier 175) and regulates (power regulator 180) the carrier signal and feeds the resultant signal to the MCU 155 and driver 160. The MCU 155 measures force sensors (force tip 190 and force eraser 195) and button states (button(s) 185) and couples the resultant data signal to the driver 160. The driver 160 drives the inductor tip 170 and inductor eraser 165, which inductively couples the stylus 150 to the inductive sense array 107.

Stylus 150 sensing is implemented largely independent of the finger-sensing capability of the touch screen. As described above, stylus tracking requires generating an alternative current (AC) signal by the inductive sense array 107 and inductively coupling the AC signal to the tip of the stylus 150. The inductive sense array 107, located behind the touch screen, in turn receives the stylus signal and the Host CPU 120 interpolates the position of the stylus tip (inductor tip 170) based on the relative magnitude of the received stylus signals at each of the inductive sensors of the inductive sense array 107. While inductive sensing may be reliable, inductive stylus tracking solutions exhibit serious commercial disadvantages including high power consumption, high electromagnetic interference ("EMI"), high manufacturing costs, and heavy construction. Furthermore, retro fitting an existing touch sensor (passive touch object sensor) to include independent stylus tracking would require an additional PCB 105 layer to incorporate the inductive sense array 107.

FIG. 2A is a block diagram illustrating a conventional embodiment of a host device 200 for tracking the position of a touch object on a radio frequency ("RF") sense array. The host device 200 includes an Indium-Tin-Oxide ("ITO") panel 205, a receiver 210, a data decoder 215, a host CPU 220, and a PC 225. In FIG. 2B, the stylus 250 includes a force sensor 255, a measurer 260, a modulator 265, an amplifier 270, a stylus tip 275, and a reference clock 280. The stylus 250 is typically battery powered (not illustrated).

In operation, the stylus 250 generates, amplifies, and couples an RF carrier signal from the stylus tip 275 to the ITO panel 205 via RF coupling. The ITO panel 205 functions as an antenna and receives the RF carrier signal from the stylus 250 as described below with respect to FIG. 2B. The selective receiver 210 demodulates the RF carrier signal and couples a touch position signal to the host CPU 220 and a force data signal to the data decoder 215. The data decoder 215 extracts the force data and couples it to the host CPU 220. The host CPU 220 calculates the stylus touch position based on the relative maximum amplitude of the RF signal detected on the ITO lines of ITO panel 205. The host CPU 220 further determines the force applied to the stylus based on the force data. The PC 225 controls the host CPU 220.

FIG. 2B is a block diagram illustrating a conventional embodiment of an active stylus used in a system for tracking the position of a touch object on an RF sense array. The measurer 260 of stylus 250 measures the force induced on the force sensor 255 and the modulator 265 modulates the resultant force data with a carrier frequency, provided by the reference clock 280. The amplifier 270 amplifies the modulated signal and transmits the modulated carrier frequency from the stylus tip 275. As described above, the host 200 decodes the modulated carrier signal and transmits the result to the PC 225. While an RF sense array solution may offer cost savings and a reduced component count, they require special narrow band receivers on the host 200 and are subject to RF noise and interference. Consequently, conventional touch panel solutions may have significant disadvantages in cost, performance, applicability, and reliability.

BRIEF DESCRIPTION OF THE DRAWINGS

The present invention is illustrated by way of example, and not of limitation, in the figures of the accompanying drawings in which:

FIG. 1A is a block diagram illustrating a conventional embodiment of a host device for tracking the position of a touch object on an inductive sense array.

FIG. 1B is a block diagram illustrating a conventional embodiment of an active stylus used in a system for tracking the position of a stylus on an inductive sense array.

FIG. 2A is a block diagram illustrating a conventional embodiment of a host device for tracking the position of a stylus on a radio frequency sense array.

FIG. 2B is a block diagram illustrating a conventional embodiment of an active stylus used in a system for tracking the position of a stylus on a radio frequency sense array.

DETAILED DESCRIPTION

Apparatuses and methods of synchronizing a capacitive sense array to a stylus are described. In one embodiment, the stylus is configured to operate as the timing "master," and a touch screen controller adjusts the timing of the capacitive sense array to match that of the stylus when the stylus is in use. The stylus capacitively couples the stylus transmit ("TX") signal to the capacitive sense array. The touch screen controller may also be configured to substantially simultaneously track the position of both a passive touch object (e.g., a finger) and the stylus. In one embodiment, the stylus is configured to modulate additional data into the stylus TX signal, including, but not limited to, stylus tip force data, stylus button data, stylus acceleration, and stylus battery data. In an embodiment, the touch screen controller is configured to transmit a TX signal on the row electrodes of the capacitive sense array, and receive the resulting RX signal on the column electrodes of the capacitive sense array to track the position of a passive touch object on the capacitive sense array. In another embodiment, the touch screen controller is configured to receive the stylus TX signal on both the rows and columns of electrodes. It should be noted that the touch screen controller may utilize the row and column electrodes interchangeably to transmit and receive the TX & RX signals for locating and tracking the position of a passive touch object.

In the following description, for purposes of explanation, numerous specific details are set forth in order to provide a thorough understanding of the present invention. It will be evident, however, to one skilled in the art that the present invention may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment.

Figure 3:
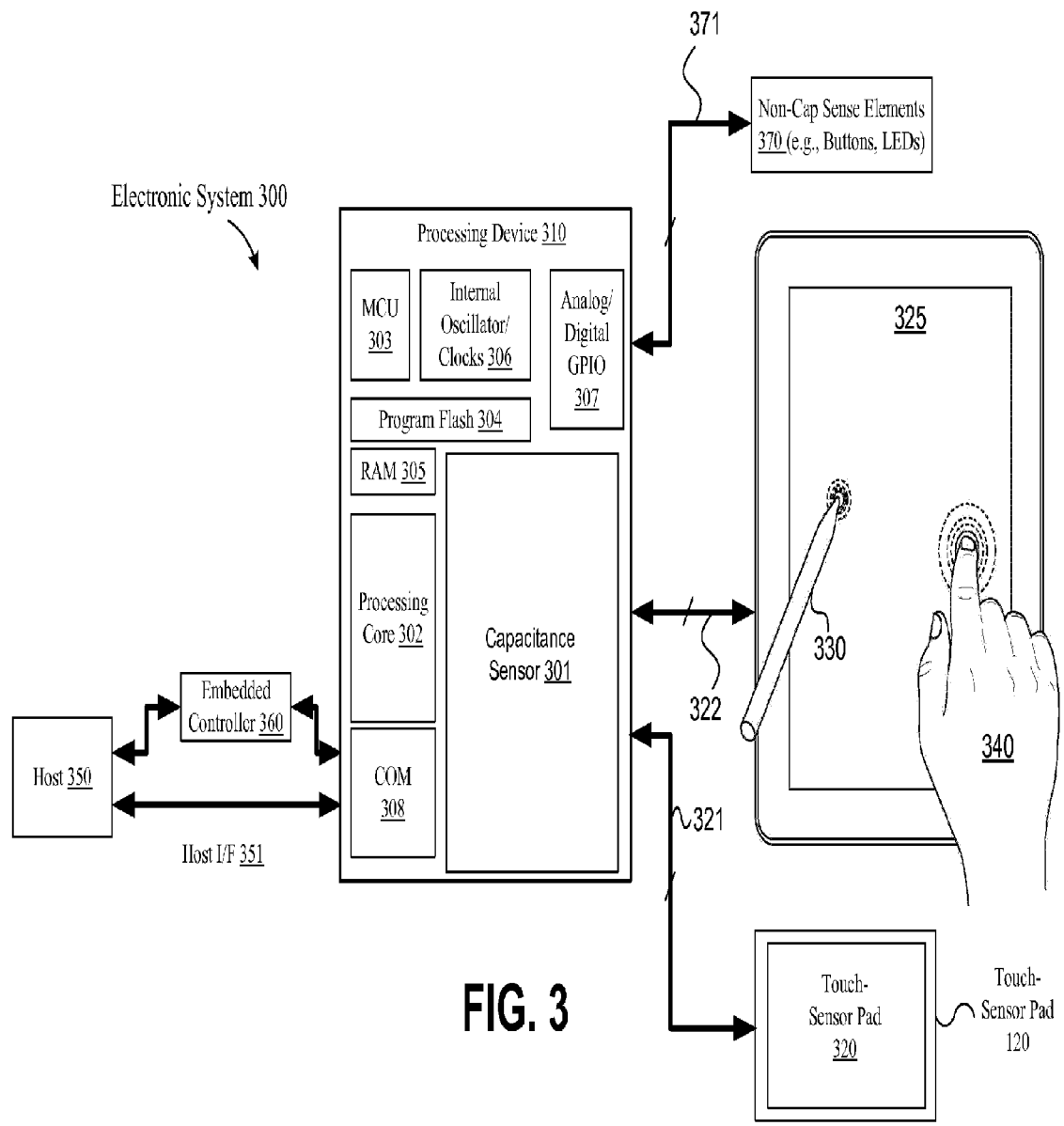
FIG. 3 is a block diagram illustrating one embodiment of an electronic system having a processing device for detecting a presence of a touch object and a stylus.

FIG. 3 is a block diagram illustrating one embodiment of an electronic system 300 having a processing device 310 for detecting a presence of a touch object 340 and a stylus 330. Electronic system 300 includes processing device 310, touch screen 325, touch sensor pad 320, stylus 330, host processor 350, embedded controller 360, and non-capacitance sense elements 370. In the depicted embodiment, the electronic system 300 includes the touch screen 325 coupled to the processing device 310 via bus 322. Touch screen 325 may include a multi-dimension capacitive sense array. The multi-dimension sense array includes multiple sense elements, organized as rows and columns. In another embodiment, the touch screen 325 operates as an all-points-addressable ("APA") mutual capacitance sense array, as described with respect to FIG. 4. In another embodiment, the touch screen 325 operates as a coupled-charge receiver, as described with respect to FIG. 4.

The operations and configurations of the processing device 310 and the touch screen 325 for detecting and tracking the touch object 340 and stylus 330 are described in detail below with respect to FIGS. 4-6B. In short, the processing device 310 is configured to detect a presence of the stylus 330 on the touch screen 325, as well as a presence of the touch object 340. The processing device 310 may detect and track the stylus 330 and the touch object 340 individually on the touch screen 325. In one embodiment, the processing device 310 can detect and track both the stylus 330 and touch object 340 concurrently on the touch screen 325. In one embodiment, the stylus 330 is configured to operate as the timing "master," and the processing device 310 adjusts the timing of the touch screen 325 to match that of the stylus 330 when the stylus 330 is in use. As described herein, the touch screen 325 capacitively couples with the stylus 330, as opposed to conventional inductive stylus applications. It should also be noted that the same assembly used for the touch screen 325, which is configured to detect touch objects 340, is also used to detect and track the stylus 330 without an additional PCB layer for inductively tracking the stylus 330 as done conventionally.

In the depicted embodiment, the processing device 310 includes analog and/or digital general purpose input/output ("GPIO") ports 307. GPIO ports 307 may be programmable. GPIO ports 307 may be coupled to a Programmable Interconnect and Logic ("PIL"), which acts as an interconnect between GPIO ports 307 and a digital block array of the processing device 310 (not shown). The digital block array may be configured to implement a variety of digital logic circuits (e.g., DACs, digital filters, or digital control systems) using, in one embodiment, configurable user modules ("UMs"). The digital block array may be coupled to a system bus. Processing device 310 may also include memory, such as random access memory ("RAM") 305 and program flash 304. RAM 305 may be static RAM ("SRAM"), and program flash 304 may be a non-volatile storage, which may be used to store firmware (e.g., control algorithms executable by processing core 302 to implement operations described herein). Processing device 310 may also include a memory controller unit ("MCU") 303 coupled to memory and the processing core 302.

The processing device 310 may also include an analog block array (not shown). The analog block array is also coupled to the system bus. Analog block array also may be configured to implement a variety of analog circuits (e.g., ADCs or analog filters) using, in one embodiment, configurable UMs. The analog block array may also be coupled to the GPIO 307.

As illustrated, capacitance sensor 301 may be integrated into processing device 310. Capacitance sensor 301 may include analog I/O for coupling to an external component, such as touch-sensor pad 320, touch screen 325, touch-sensor slider (not shown), touch-sensor buttons (not shown), and/or other devices. Capacitance sensor 301 and processing device 310 are described in more detail below.

In one embodiment, the electronic system 300 includes a touch sensor pad 320 coupled to the processing device 310 via bus 321. Touch sensor pad 320 may include a multi-dimension capacitive sense array. The multi-dimension sense array includes multiple sense elements, organized as rows and columns. In another embodiment, the touch sensor pad 320 is an APA mutual capacitance sense array, as described with respect to FIG. 4. In another embodiment, the touch sensor pad 320 operates as a coupled-charge receiver, as described with respect to FIG. 4.

In an embodiment, the electronic system 300 may also include non-capacitance sense elements 370 coupled to the processing device 310 via bus 371 and GPIO port 307. The non-capacitance sense elements 370 may include buttons, light emitting diodes ("LEDs"), and other user interface devices, such as a mouse, a keyboard, or other functional keys that do not require capacitance sensing. In one embodiment, buses 321, 322, and 371 are embodied in a single bus. Alternatively, these buses may be configured into any combination of one or more separate buses.

Processing device 310 may include internal oscillator/clocks 306 and communication block ("COM") 308. In another embodiment, the processing device 310 includes a spread spectrum clock (not shown). The oscillator/clocks block 306 provides clock signals to one or more of the components of processing device 310. Communication block 308 may be used to communicate with an external component, such as a host processor 350, via host interface ("I/F") line 351. Alternatively, processing block 310 may also be coupled to embedded controller 360 to communicate with the external components, such as host 350. In one embodiment, the processing device 310 is configured to communicate with the embedded controller 360 or the host 350 to send and/or receive data.

Processing device 310 may reside on a common carrier substrate such as, for example, an integrated circuit ("IC") die substrate, a multi-chip module substrate, or the like. Alternatively, the components of processing device 310 may be one or more separate integrated circuits and/or discrete components. In one exemplary embodiment, processing device 310 is the Programmable System on a Chip (PSoC®) processing device, developed by Cypress Semiconductor Corporation, San Jose, Calif. Alternatively, processing device 310 may be one or more other processing devices known by those of ordinary skill in the art, such as a microprocessor or central processing unit, a controller, special-purpose processor, digital signal processor ("DSP"), an application specific integrated circuit ("ASIC"), a field programmable gate array ("FPGA"), or the like.

It should also be noted that the embodiments described herein are not limited to having a configuration of a processing device coupled to a host, but may include a system that measures the capacitance on the sensing device and sends the raw data to a host computer where it is analyzed by an application. In effect, the processing that is done by processing device 310 may also be done in the host.

Capacitance sensor 301 may be integrated into the IC of the processing device 310, or alternatively, in a separate IC. Alternatively, descriptions of capacitance sensor 301 may be generated and compiled for incorporation into other integrated circuits. For example, behavioral level code describing capacitance sensor 301, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout all represent various levels of abstraction to describe capacitance sensor 301.

It should be noted that the components of electronic system 300 may include all the components described above. Alternatively, electronic system 300 may include only some of the components described above.

In one embodiment, the electronic system 300 is used in a tablet computer. Alternatively, the electronic device may be used in other applications, such as a notebook computer, a mobile handset, a personal data assistant ("PDA"), a keyboard, a television, a remote control, a monitor, a handheld multi-media device, a handheld media (audio and/or video) player, a handheld gaming device, a signature input device for point of sale transactions, and eBook reader, global position system ("GPS") or a control panel. The embodiments described herein are not limited to touch screens or touch-sensor pads for notebook implementations, but can be used in other capacitive sensing implementations, for example, the sensing device may be a touch-sensor slider (not shown) or touch-sensor buttons (e.g., capacitance sensing buttons). In one embodiment, these sensing devices include one or more capacitive sensors. The operations described herein are not limited to notebook pointer operations, but can include other operations, such as lighting control (dimmer), volume control, graphic equalizer control, speed control, or other control operations requiring gradual or discrete adjustments. It should also be noted that these embodiments of capacitive sensing implementations may be used in conjunction with non-capacitive sensing elements, including but not limited to pick buttons, sliders (ex. display brightness and contrast), scroll-wheels, multi-media control (ex. volume, track advance, etc) handwriting recognition, and numeric keypad operation.

Figure 4:
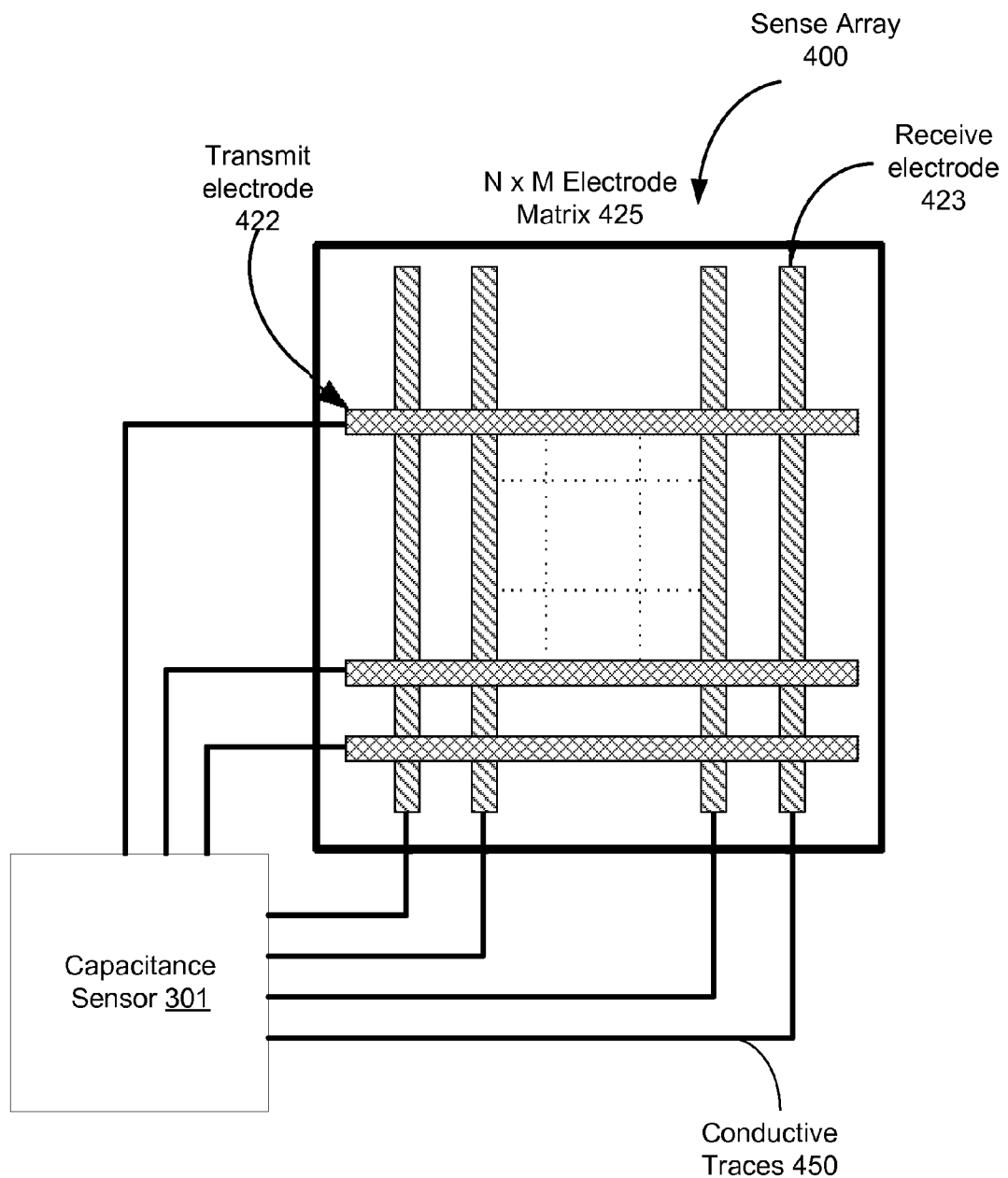
FIG. 4 is a block diagram illustrating one embodiment of a capacitance sense array including an N×M electrode matrix and a capacitance sensor that converts measured capacitances to touch coordinates.

FIG. 4 is a block diagram illustrating one embodiment of a capacitive sense array 400 sense array including an N×M electrode matrix 425 and the capacitance sensor 301 that converts measured capacitances to touch coordinates. The sense array 400 may be, for example, the touch screen 325 or the touch sensor pad of FIG. 3. The N×M electrode matrix 425 includes N×M electrodes (N receive electrodes and M transmit electrodes), which further includes transmit ("TX") electrode 422 and receive ("RX") electrode 423. Each of the electrodes in N×M electrode matrix 425 is connected to the capacitance sensor 301 by one of the conductive traces 450. In one embodiment, capacitance sensor 301 operates using a charge accumulation circuit, a capacitance modulation circuit, or other capacitance sensing methods known by those skilled in the art. In an embodiment, the capacitance sensor 301 is of the Cypress TMA-3xx family of touch screen controllers. Alternatively, other capacitance sensors may be used. The mutual capacitance sense arrays, or touch screens, as described above, may include a transparent, conductive sense array disposed on, in, or under either a visual display itself (e.g. LCD monitor), or a transparent substrate in front of the display. In an embodiment, the TX and RX electrodes are configured in rows and columns, respectively. In should be noted that the rows and columns of electrodes can be configured as TX or RX electrodes by the capacitance sensor 301 in any chosen combination. In one embodiment, the TX and RX electrodes of the sense array 400 are configured to operate as a TX and RX electrodes of a mutual capacitance sense array in a first mode to detect touch objects, and to operate as electrodes of a coupled-charge receiver in a second mode to detect a stylus on the same electrodes of the sense array. The stylus, which generates a stylus TX signal when activated, is used to couple charge to the capacitive sense array, instead of measuring a mutual capacitance at an intersection of a RX electrode and a TX electrode (a sense element) as done during mutual capacitance sensing. The capacitance sensor 301 does not use mutual capacitance or self-capacitance sensing to measure capacitances of the sense elements when performing a stylus can. Rather, the capacitance sensor 301 measures a charge that is capacitively coupled between the sense array 400 and the stylus as described herein.

The TX and RX electrodes in the N×M electrode matrix 425 are arranged orthogonally so that each of the TX electrodes intersects and overlaps each of the RX electrodes at a total of N*M intersections, creating N*M individual sense elements in the array. Thus, each TX electrode is capacitively coupled with each of the RX electrodes. For example, TX electrode 422 is capacitively coupled with RX electrode 423 at the point where TX electrode 422 and RX electrode 423 overlap. The intersections of TX and RX electrodes 422 and 423 each form a capacitive sense element.

Because of the capacitive coupling between the TX and RX electrodes, the application of a TX signal at each TX electrode induces a current at each of the RX electrodes. For instance, when a TX signal is applied to TX electrode 422, the TX signal induces an RX signal on the RX electrode 423 in N×M electrode matrix 425. The RX signal on each of the RX electrodes can then be measured in sequence by using a multiplexor to connect each of the N RX electrodes to a demodulation circuit in sequence. The capacitance associated with each intersection between a TX electrode and an RX electrode can be sensed by selecting every available combination of TX electrode and RX electrode.

When a touch object, such as a finger, approaches the N×M electrode matrix 625, the object causes a decrease in capacitance affecting only some of the electrodes. For example, if a finger is placed near the intersection of TX electrode 422 and RX electrode 423 (sense element), the presence of the finger decreases the coupling capacitance between the two electrodes 422 and 423. In another embodiment, the presence of the finger increases the coupling capacitance between the two electrodes 422 and 423. Thus, the location of the finger on the touchpad can be determined by identifying both the RX electrode having a changed coupling capacitance between the RX electrode and the TX electrode to which the TX signal was applied at the time the changed capacitance was measured on the RX electrode. Therefore, by sequentially determining the capacitances associated with each intersection of electrodes in the N×M electrode matrix 425, the locations of one or more inputs can be determined. It should be noted that the process can calibrate the sense elements (intersections of RX and TX electrodes by determining baselines for each of the sense elements. It should also be noted that interpolation may be used to detect finger position at better resolutions than the row/column pitch as would be appreciated by one of ordinary skill in the art having the benefit of this disclosure. In addition, various types of centroid algorithms may be used to detect the center of the touch as would be appreciated by one of ordinary skill in the art having the benefit of this disclosure.

Figure 5A:
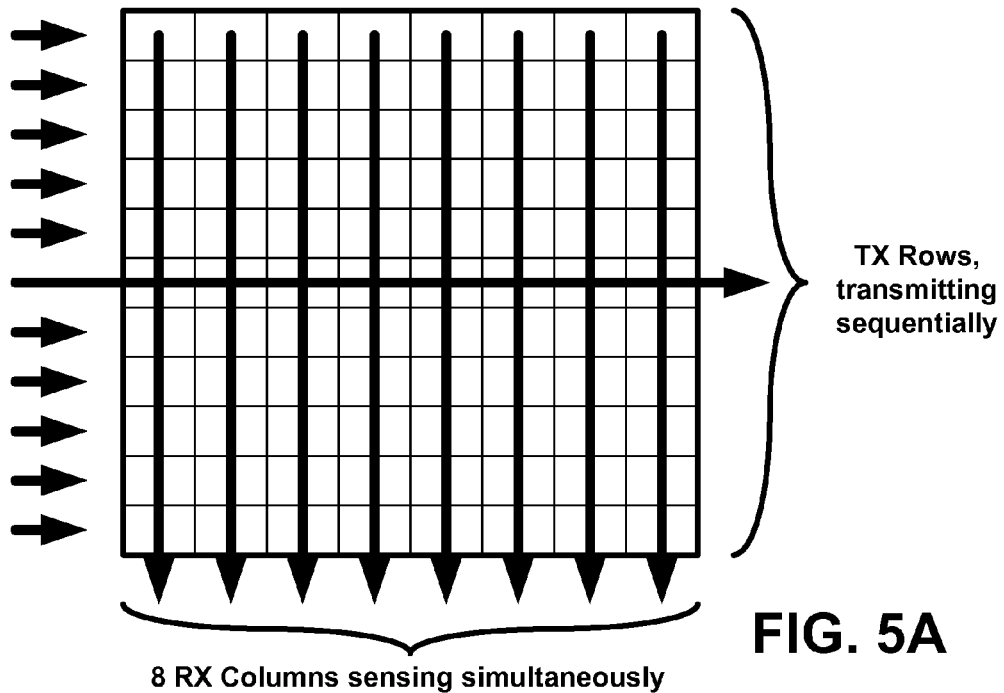
FIG. 5A is diagram illustrating one embodiment of a method of scanning an all-points-addressable mutual capacitance sense array.
Figure 5B:
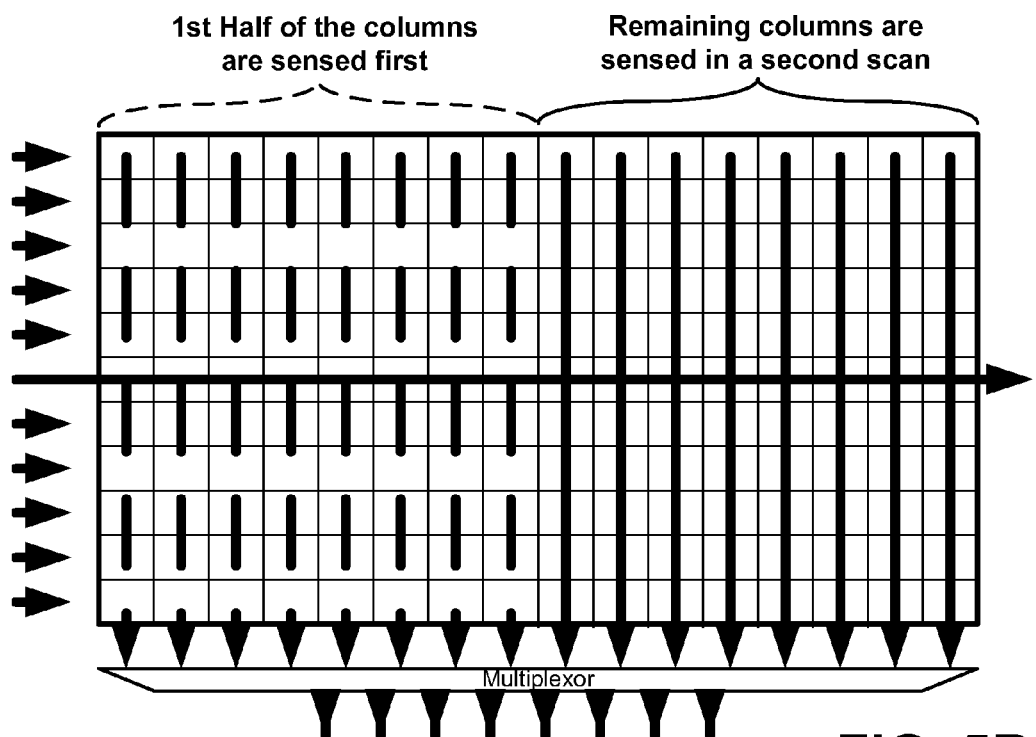
FIG. 5B is diagram illustrating one embodiment of a method of scanning an all-points-addressable mutual capacitance sense array.

In other words, sensing is achieved by applying a transmit signal to each row of TX electrodes in turn for a short period of time and during that period, sensing the amount of charge coupled from that row of TX electrodes to each of the columns of RX electrodes. In one embodiment, the charge coupled from TX electrodes to RX electrodes at each intersection is measured one row at a time, (as shown in FIG. 5A) until a map of charge measurements has been created for the entire screen. In other embodiments, each row may need to be driven twice and subsequently multiplexed if there are more columns than available sensing channels, as shown in FIG.

5B. Other variations of scanning patterns may be used as would be appreciated by one of ordinary skill in the art. Furthermore, the conversion of the induced RX signal to touch position coordinates indicating a position of an input on a touch sensor pad would be understood by those of ordinary skill in the art.

Although the TX and RX electrodes 422, 423, appear as bars or elongated rectangles in FIG. 4, alternative embodiments may use various tessellated shapes such as diamonds, rhomboids, chevrons, and other useable shapes as would be appreciated by one of ordinary skill in the art having the benefit of this disclosure.

Figure 6A:
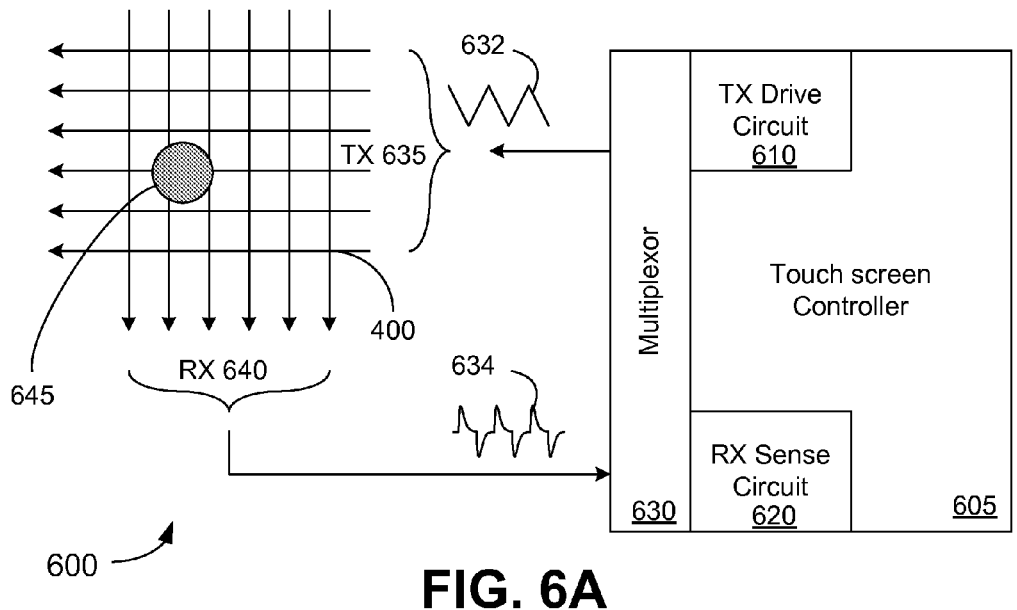
FIG. 6A is a block diagram illustrating one embodiment of a system including a capacitive sense array and a touch screen controller that converts measured capacitances to touch coordinates.

FIG. 6A is a block diagram illustrating one embodiment of a system 600 including the sense array 400 and a touch screen controller 605 that converts measured capacitances to touch coordinates. In an embodiment, the touch screen controller 605 is similar to the capacitance sensor 301 described above. In another embodiment, the touch screen controller 605 is the processing device 310. The sense array 400 includes TX lines 635 and RX lines 640. In an embodiment, the TX lines 635 and RX lines 640 are the TX electrodes 422 and RX electrodes 423 of FIG. 4, respectively. The touch screen controller 605 includes a TX drive circuit 610, an RX sense circuit 620, and a multiplexor 630.

In an embodiment, a passive object (e.g., a finger or other conductive object) touches the sense array 400 at contact point 645. The TX drive circuit 610 drives the TX lines 635 with TX signal 632. The RX sense circuit 620 measures the RX signal 634 on RX lines 640. In an embodiment, the touch screen controller 605 determines the location of contact point 645 based on the mapping techniques described above in conjunction with FIGS. 4-5. The TX lines 635 and RX lines 640 are multiplexed by multiplexor 630. The touch screen controller 605 provides the TX signal 632 on the TX lines 635 (rows) and measures the capacitance on the RX lines 640 (columns). In an embodiment, the TX and RX lines 635, 640 are orthogonal and may be used interchangeably (e.g., transmitting on columns and receiving on rows). In an embodiment, the TX drive circuit 610 transmits the TX signal 632 through a high impedance ITO panel (TX lines 635), thus limiting the upper frequency limit and speed of the system. The total scan time may also dependent upon the number of TX lines 635 and RX lines 640 in the sense array 400. For example, the TX drive circuit 610 provides a TX signal 632 on each TX line 635 and simultaneously reads the capacitively coupled RX signal 634 on each RX line 640, according to one embodiment. In another embodiment, the RX lines 640 are multiplexed in two or more scans, as described in conjunction with FIG. 5B.

Figure 6B:
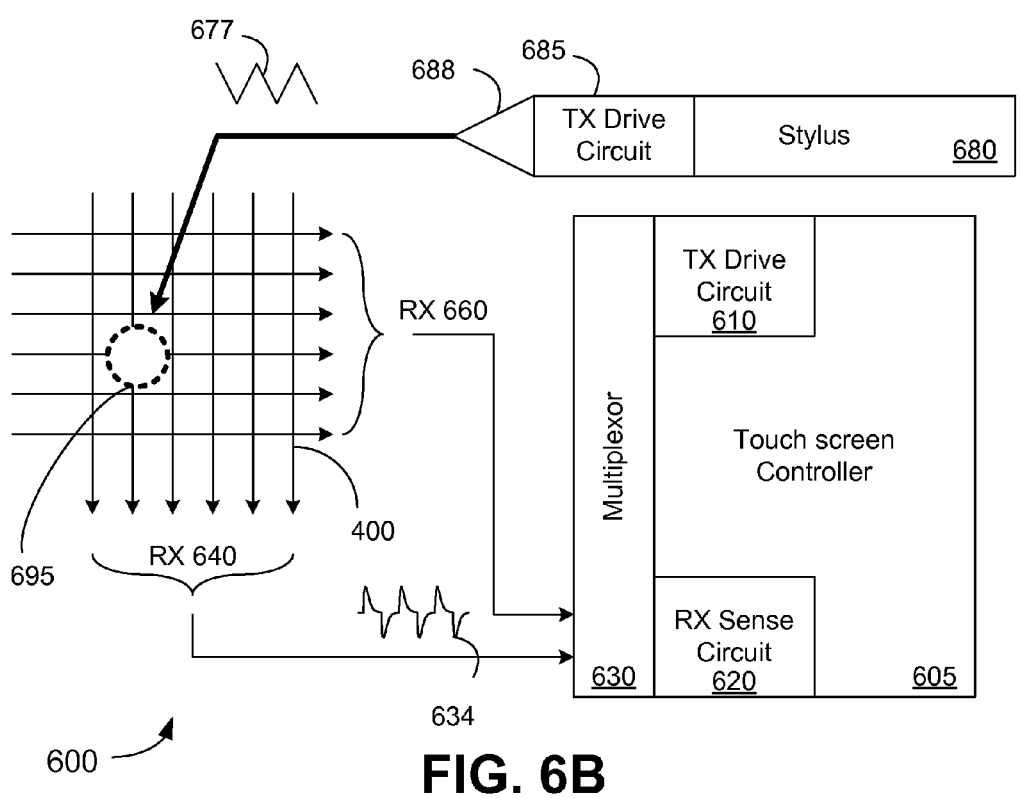
FIG. 6B is a block diagram illustrating one embodiment of a system including a capacitive sense array, a stylus, and a touch screen controller that converts measured capacitances to touch coordinates.

FIG. 6B is a block diagram illustrating one embodiment of a system 600 including the sense array 400, a stylus 680, and the touch screen controller 605 that converts measured capacitances to touch coordinates. The sense array 400 includes RX lines 640 and 660. The RX lines 660 are the same as TX lines 635 in FIG. 6A, but used as a receive sensing channel in system 600 as further described below. In an embodiment, RX lines 640 and 660 are similar to the TX electrodes 422 and RX electrodes 423 of FIG. 4. The touch screen controller 605 includes the TX drive circuit 610, the RX sense circuit 620, and the multiplexor 630. The stylus 680 includes a TX drive circuit 685 and a stylus tip 688.

In an embodiment, the stylus TX drive circuit 685 of stylus 680 provides a TX signal 677 directly to contact point 695 on sense array 400, thus eliminating the need to dedicate the RX 660 lines (previously TX 635 in FIG. 6A) to transmitting a TX signal from the TX drive circuit 610. As such, the RX sense circuit 620 measures the RX signal 634 on both the rows (RX lines 660) and columns (RX lines 640) of sense array. This results in faster position tracking because the TX signal no longer passes through the high impedance ITO lines, resulting in a faster scan time during stylus sensing than when mutual-capacitance sensing for a conductive object. In one embodiment, the touch screen controller 605 performs a normal scan of the sense array 400 during RX sensing of TX signal from the TX drive circuit 660 (illustrated in FIG. 6A), and a stylus scan of the sense array 400 during RX sensing of the stylus TX signal 677 (illustrated in FIG. 6B). For the stylus scan, the touch screen controller 605 measures a charge being capacitively coupled to the row and column electrodes of the sense array from the stylus. To further illustrate, a mutual capacitance scan uses both a TX and RX signal 632, 634 to locate and track an object. As described above, this is typically done by sensing each of the RX lines 640 for each driven TX line 635 in a successive fashion by the touch screen controller 655. In an array of N rows (TX signal) and M columns (RX signal), a complete scan would require N×M total scans if one RX line is sensed at a time. For example, transmitting a TX signal ("TX'ing") on row 1, and receiving a receive signal ("RX'ing") on columns 1-M, followed by TX'ing on row 2 and RX'ing on columns 1-M, and so on in sequential fashion.

Alternatively, more RX lines can be sensed at a time. In one embodiment, 4 or 8 RX lines are sensed at a time, but in other embodiments, all RX lines may be sense simultaneously or sequentially. With multiple RX channels to sense more than one RX line at the same time, the complete scan would be (N*M)/(# RX channels). In contrast, a stylus scan does not require a TX signal by the TX drive circuit 610 and a complete scan would only require a single RX signal measurement on each row and column, or N+M scans, thus resulting in a significantly reduced stylus scanning time for the entire sense array as compared with mutual capacitance scanning time for the entire sense array. Like above, multiple RX channels can be used to sense multiple RX lines at the same time. In this case, the complete scan would be (N+M)/(# RX channels).

As described above, a passive stylus may be used as a touch object to interface with the various touch screens described above. In contrast to passive styluses, an active stylus described herein provides the transmit ("TX") signal that is typically provided by the touch screen controller 605 in finger sensing modes, as described above in conjunction with FIGS. 6A and 6B. The stylus is used to couple charge into the capacitive sense array, and the capacitive sense array operates as a coupled-charge receiver to detect the stylus. When operating as the coupled-charge receiver, the capacitive sense array does not use mutual capacitance or self-capacitive sensing. The same capacitive sense array can operate in a different mode when detecting touch objects, for example, using mutual capacitance sensing.

The stylus 680 capacitively couples the stylus TX signal 677 to the sense array 400, as described above in conjunction with FIGS. 4-6. In an embodiment, the stylus signal amplitude, frequency, phase, etc., may be the same or similar to that which is utilized for finger sensing by the touch screen controller 605. Alternatively, the stylus TX signal may be different than the TX signal from the TX drive circuit 610, in amplitude, frequency, and phase. In another embodiment, the stylus TX signal may have a different sequence for code modulation than a sequence used in the TX signal from the TX drive circuit 610. In an exemplary embodiment, the stylus TX signal 677 has a greater amplitude than the finger sensing TX signal 632 from the TX drive circuit 610. For example, in one exemplary embodiment, the stylus TX signal 635 ranges from approximately 20-50V, as compared with the approximately 5-10V typically provided by the touch screen controller 605. Alternatively, other voltages may be used as would be appreciated by one of ordinary skill in the art. The higher stylus TX voltage couples more charge to the MC array 400 more quickly, thus reducing the amount of time required to sense each row and column of the sense array 400. Other embodiments may incorporate higher voltages on the MC array TX line 635 to obtain similar time efficiency improvements for finger sensing.

In an embodiment, the stylus 680 applies a higher frequency on the stylus TX signal 677 than the TX signal 632 frequency from TX drive circuit 610 to achieve a reduced sensing time. Charge may be capacitively coupled from the stylus 680 to the sense array 400 during the rising and falling edges of the stylus TX signal 677. Thus, a higher TX frequency provides a greater number of rising and falling edges over a given period of time, resulting in greater charge coupling in a given period than with a low frequency. The practical upper limit of the TX frequency in finger sensing mode (e.g., TX signal on sense array 400 for finger sensing) is dependent upon the resistor-capacitor ("RC") time constant of the individual sense elements and interconnect (not shown). This is typically due to high impedance materials (e.g. ITO) used in the fabrication of the sense array 400. A high-impedance sense array 400 may result in a high time constant and resulting signal attenuation of the rows (TX lines 635) and columns (RX lines 640) of sensors, which may limit the maximum sensing frequency. When using an active stylus to transmit the stylus TX signal 677 directly to a contact point on sense array 400, the stylus TX signal 677 does not have to pass through all of the high impedance path, and therefore the maximum operating frequency for the stylus TX signal 677 can be increased, as described above in conjunction with FIGS. 6A and 6B. For example, the time constant of the RX traces (both rows and columns) may be used to determine an upper frequency limit, but this typically is at least double the upper frequency limit used in finger sensing. Typically the impedance is half to the impedance when performing mutual capacitance scanning, since the row's impedance is eliminated and the column's impedance remains (or vice versa). It should be noted that both finger sensing and stylus sensing use frequency selection where the operation period should be smaller than the panel's time constant; so, restrictions for the operation frequency selection are approximately the same for finger and stylus sensing.

In an embodiment, the frequency of the stylus TX signal 677 is different than the frequency of the finger sensing TX signal 632. By using different TX frequencies, the touch screen controller 605 can differentiate between stylus TX signals and finger sensing TX signals. This applies when the controller is performing mutual capacitance sensing. If the controller is not driving any of the TX lines, it can be inferred that any RX signals detected have come from a stylus. Alternatively, the touch screen controller 605 can differentiate the stylus TX signals from the TX drive circuit 610 TX signals 632 using other techniques as would be appreciated by those of ordinary skill in the art with the benefit of this disclosure, such as detecting the difference is signal characteristics (e.g., phase, frequency, amplitude, and code modulation).

In an embodiment, the stylus 680 encodes the stylus TX signal 677 to include additional data to be used by the touch screen controller 655. Such additional information may be useful for the user to obtain additional functionality from the stylus 680. For example, additional information may include the status of additional buttons, sliders or other operator actuated controls on the stylus 680. The addition buttons may be electrical (e.g., buttons, potentiometers), inductive, or capacitive. In an embodiment, force sensing, or the pressure with which the stylus tip 688 is pressed against the touch screen or sense array 400, is detected by the stylus 680 and encoded in the stylus TX signal 677. A force may be detected by either a passive sensor (e.g., force sensing resistor or capacitor) or active sensor (e.g., capacitive linear position sensor or a moving element in relation to a coil) within the stylus 680. Furthermore, the orientation or acceleration of the stylus may be detected (e.g., by an accelerometer) and encoded in the stylus TX signal 677 for greater stylus 680 functionality. Such additional information may be transmitted from the stylus 680 to the touch controller 605 in a variety of ways and is not limited to modulating the stylus TX signal 677. The tip force, for example, may be used to vary the line width in a drawing program, to detect when the stylus is in contact with the screen, or to detect gestures such as a "tap gesture," or "double-tap" gesture, or the like.

In an embodiment, the stylus 680 encodes the stylus TX signal 677 with the additional data using modulation. Such modulation may include frequency modulation ("FM"), frequency-shift keying ("FSK"), amplitude modulation ("AM"), amplitude-shift keying ("ASK"), on-off keying ("OOK"), pulse position modulation, phase modulation ("PM"), Manchester encoding, direct sequence spread spectrum ("DSSS"), and other modulation schemes appreciated by those of ordinary skill in the art. PM modulation may further include binary phase shift keying ("BPS K") or quadrature phase shift keying ("QPSK") encoding schemes.

Alternative embodiments may be implemented to transfer additional data from the stylus 680 to the touch screen controller 605 in lieu of modulating the stylus TX signal 677. In one embodiment, the stylus 680 transmits the additional data separately from the stylus TX signal 677, but using the same capacitive coupling to the sense array 400. For example, in time division multiplexing ("TDM") the stylus 680 transmits the stylus TX signal 677 in one time slot, and transmits the additional data (e.g., force data, acceleration data) in another time slot. In one embodiment, the stylus TX signal 677 and additional data utilize the same or different frequencies. In another embodiment, the stylus TX signal 677 and additional data utilize one or more of the modulation methods previously described. In further embodiments, optical, ultrasonic, inductive, or RF signal transmissions may be utilized to transfer the additional data from the stylus 680 to the touch screen controller 655. It should be noted that additional hardware, such as antennas and amplifiers may be needed to transmit the additional data on the separate communication link.

Figure 7A:
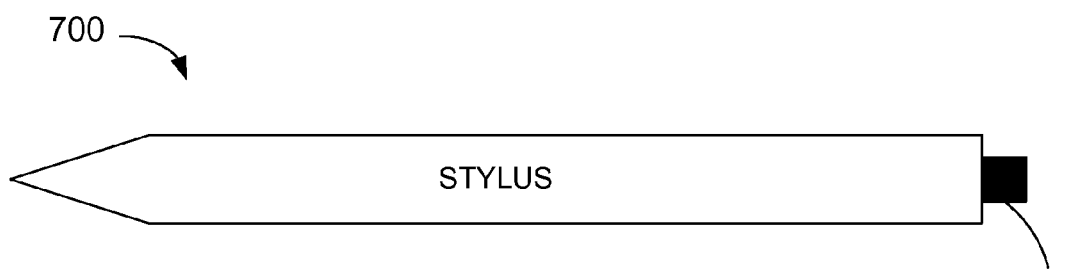
FIG. 7A is a block diagram illustrating one embodiment of a stylus including an on/off switch.

In one embodiment, in order to minimize the power consumption of the stylus 680 and maximize battery life, the stylus 680 does not generate or transmit stylus TX signals 677 unless it is touching or in proximity to the sense array 400. In one embodiment, the user operates an on/off switch to begin generating the stylus TX signal 677. FIG. 7A is a block diagram illustrating one embodiment of a stylus 700 including an on/off switch 705. In an embodiment, the on/off switch 705 may be an actuator configured to be enabled (i.e., switched from the "off" position to the "on" position and vice versa) by depressing, rotating, or sliding the actuator. The on/off switch 705 may be mechanical, electrical, or other type of manual switch known by those of ordinary skill in the art.

Figure 7B:
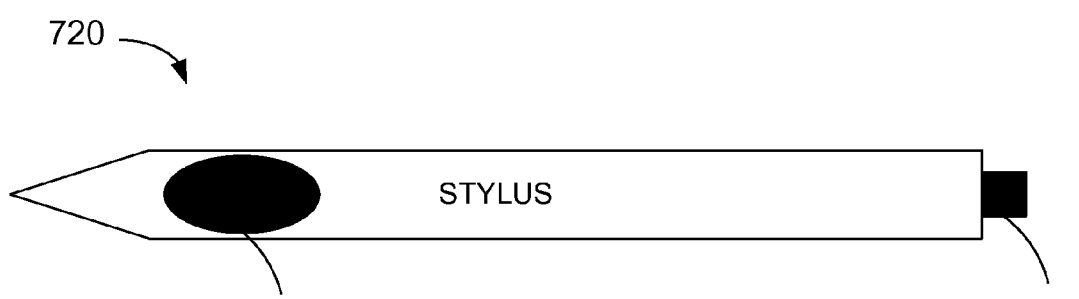
FIG. 7B is a block diagram illustrating one embodiment of a stylus including a capacitive sense element to detect when the stylus is in use.

FIG. 7B is a block diagram illustrating one embodiment of a stylus 720 including a capacitive sense element 730 to detect when the stylus is in use. In one embodiment, the stylus 720 includes an on/off switch 725 similar to that which is described above in conjunction with FIG. 7A. The on/off switch 725 is combined with a sleep mode. The sleep mode is a low power mode where the stylus 720 uses a small amount of power to detect whether it is currently in use by a user. For example, a user turns on the stylus 720 by depressing the on/off switch 725 and the stylus 720 begins transmitting a stylus TX signal 677. After a predetermined period of nonuse, the stylus 720 enters a low power state ("sleep mode") and stops transmitting the stylus TX signal 677. The stylus 720 remains in the low power state until a touch object (e.g., a finger, hand, etc.) is detected on the capacitive sense element 730. In an embodiment, the stylus 720 periodically measures the capacitance on the capacitance sense element 730 to detect use (e.g., every 250 ms); however, the detect period or duty cycle may be configured as necessary. Upon detection of a touch object, the stylus 720 begins retransmitting the stylus TX signal 677 until either the predetermined period lapses or the user turns the stylus off via the on/off switch 725. In another embodiment, the stylus 720 turns off the stylus after a predetermined period has lapsed in the low power state.

Figure 7C:
FIG. 7C is a block diagram illustrating one embodiment of a stylus including a stylus tip with multiple function capabilities.

FIG. 7C is a block diagram illustrating one embodiment of a stylus 740 including a stylus tip 745 with multiple function capabilities. In an embodiment, the stylus tip 745 is configured to sense mechanical pressure (e.g., force data) when the stylus tip 745 makes contact with the sense array 400 or touch panel (not shown). The stylus 740 may be configured to employ a "wake on force sensing" feature. For example, the stylus 740 utilizes the force data to detect use of the stylus 740 to change the mode of operation from a low power sleep mode to an active stylus TX transmit mode, as similarly described in conjunction with FIG. 7B. In other embodiments, the stylus 740 transmits stylus TX signals 677 while a force signal is present and remains active for an additional time out period afterwards (e.g., 15 seconds). In an embodiment, the stylus tip 745 may also detect use by detecting the touch screen TX signal (TX signal 632), detecting liquid crystal display ("LCD") noise, and/or detecting LCD optical signals. The features descried in FIGS. 7A-7C may be used alone or in any combination thereof.

Figure 8:
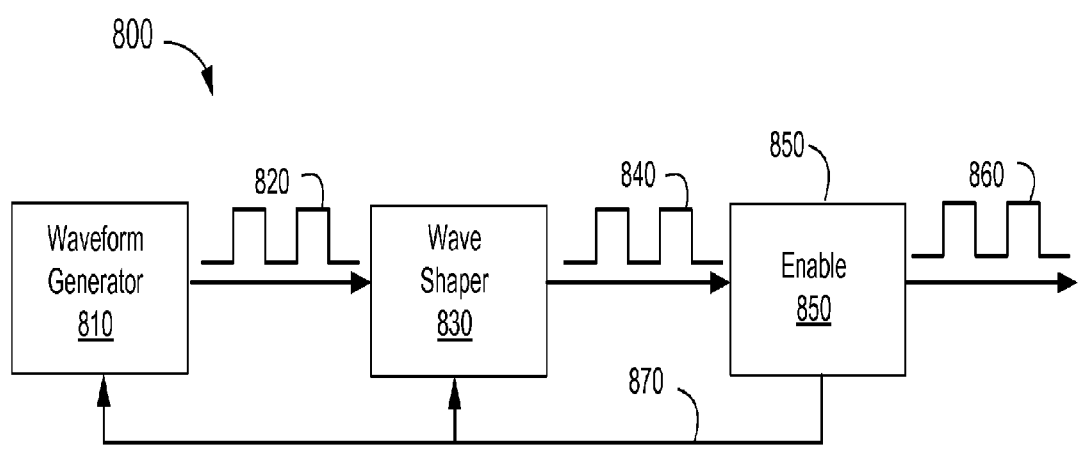
FIG. 8 is a block diagram illustrating one embodiment of a stylus.

FIG. 8 is a block diagram illustrating one embodiment of a stylus 800. The stylus 800 includes a waveform generator 810, a wave shaper 830, and an enable block 850. In one embodiment, the waveform generator 810 is an oscillator. The oscillator may be a crystal, a ceramic resonator, ring oscillator, CPU internal oscillator, relaxation oscillator, or other waveform generating circuits known by those skilled in the art. In an embodiment, the waveform generator 810 generates a stylus TX signal 820 and couples it to the wave shaper 830 for further processing.

The wave shaper 830 may be configured to shape the frequency, duty cycle, phase, or amplitude of the TX signal 820 as required by the receiving touch screen controller (not shown). It should be noted that the square wave shape of 820, 840, and 860 is not intended to be indicative of the actual signal waveform, but merely generically indicative of the presence of a signal. The wave shaper 830 is configured to modulate or encode the TX signal 820 as described above in conjunction with FIG. 6B. In an embodiment, the wave shaper 830 couples the TX signal 840 to the enable block 850. For some applications, the wave shaper 830 may not be an integral part of TX signal generation. For example, the TX signal 820 from the waveform generator 810 may not require additional wave shaping. As such, some embodiments may not require the wave shaper 830 in the stylus 800 design.

In an embodiment, the enable block 850 is configured to enable low power or sleep mode operation, as described above in conjunction with FIG. 7C, for example. The enable block 850 may function as a separate block, as shown in FIG. 8, or may be integrated in the waveform generator 810 or wave shaper 830 blocks. In an embodiment, the enable block 850 provides a feedback path to the waveform generator 810 and/or wave shaper 830 blocks to control their activity during active and sleep modes. For example, if the enable block 850 determines that the stylus 800 should be switched from active to sleep mode due to user inactivity, the enable block 850 provides a feedback signal 870 to stop the waveform generator 810 and wave shaper 830 from generating a TX signal 820, 840. In one embodiment, the enable block 850 couples the TX signal 860 to the stylus tip (not shown) in the stylus active mode.

In an embodiment, the stylus 800 may be powered from a local primary battery, such as one or more AAA cells, button cells, hearing aid batteries, etc. Alternatively, rechargeable cells may be used including, but not limited to, nickel and lithium based batteries, flexible polymer cells, fuel cells, as well as super or ultra-capacitors. The stylus 740 may also be housed within the touch screen as in a charging station configuration, or receive power through resistive, capacitive or inductive means, as would be appreciated by one having ordinary skill in the art.

In an embodiment, the stylus 800 is configured to transmit a TX signal 860 that appears electrically similar to the TX signal 632 provided by a touch screen TX drive circuit 610 in FIG. 6A. In one embodiment, the touch screen controller (not shown) is the Cypress CY8CTMA300 processor. Alternatively, other touch screen controllers may be used. The touch screen controller typically produces a square wave TX signal 820, 840, 860 in the range of 100 KHz to 300 KHz, although other TX waveforms (e.g., sine, triangle, spread spectrum) and operating frequencies may be used as known by those skilled in the art.

A mutual capacitance touch screen system supporting an active stylus 680 is described herein, where the stylus is configured to operate as the timing "master," and the touch screen controller 605 adjusts its timing to match that of the stylus 680 when the stylus is in use. In other words, touch screen controller 605 is configured to synchronize the sense array 400 to the stylus 680. Various embodiments described herein are applicable to any mutual capacitance touch screen system using an untethered, or wireless active stylus configured to be capacitively coupled to the mutual capacitance array, where the stylus does not receive synchronization or timing data from the touch screen controller. Furthermore, the timing of the various different sequenced steps and process relating to synchronization are derived from TX signals transmitted by the stylus, as contrasted with systems that perform synchronization by the host.

To sufficiently describe the operation of an embodiment of the system 600, and the timing transitions that occur between the different operating modes of the system 600, a sample sequence of events is provided below beginning with the system 600 in an off state. At startup, the user turns of the power on and the initialization process of system 600 begins. The display (not shown) turns on and the touch screen subsystem (system 600) initializes. At this point, no finger, touch object, or stylus in proximity or contact with the sense array 400.

Figure 9:
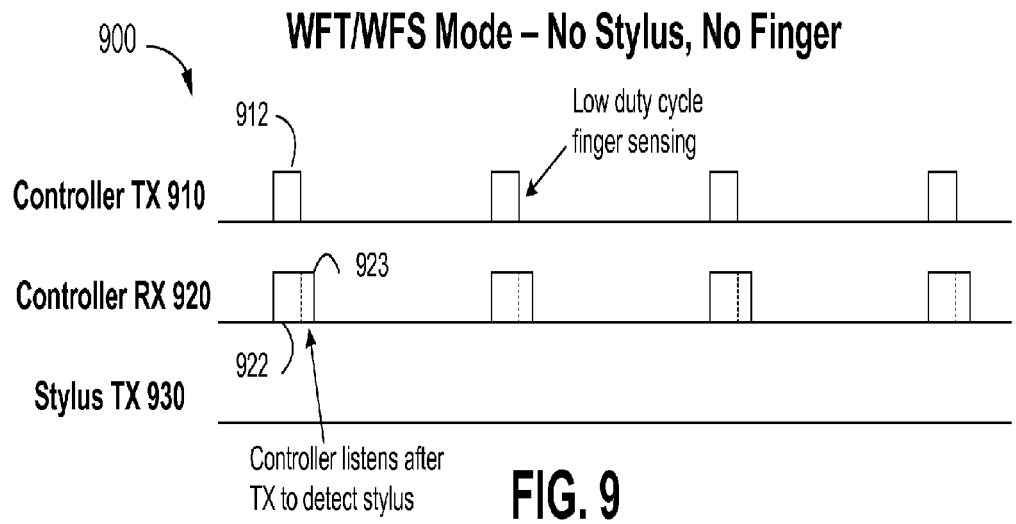
FIG. 9 is a timing diagram for a mutual capacitance touch screen system where no touch object is present on the touch screen, according to an embodiment of the invention.

FIG. 9 is a timing diagram 900 for a mutual capacitance touch screen system 600 where no touch object is present on the touch screen, according to an embodiment of the invention. The timing diagram 900 illustrates a controller TX signal 910, a controller RX signal 920, and a stylus TX signal 930. The controller TX signal 910 includes controller TX pulses 912. The controller RX signal 920 includes wait-for-touch ("WFT") interval 922 and wait-for-stylus ("WFS") interval 923. In an embodiment, the touch screen includes the sense array 400.

In operation, a user turns the power on and the system initializes. In an embodiment, the system 600 begins operation by transmitting a TX signal 632 by TX drive circuit 610 at a predetermined duty cycle. In an embodiment, the duty cycle for TX signal 632 is lower than the duty cycle for active mode where a finger or stylus is detected for improved power dissipation of the system 600. During each WFT TX sensing period 912 the controller generates signal 632, the touch screen controller 605 listens for a corresponding RX signal during WFT RX sensing period 922 to detect if a finger is present on the sense array 400; in one implementation the WFT TX sensing period 912 may occur at substantially the same time as the WFT RX sensing period 922. After each WFT interval 912/922, the touch screen controller 605 performs a WFS sensing operation during WFS sensing period 923 to sense for stylus use. The WFS interval 923 is performed similarly to the mutual capacitance WFT 922, except that the touch screen controller 605 does not transmit the TX signal 632. Instead, the touch screen controller 605 performs RX sensing, and any received signal occurring after the WFT 923 interval (ie during the WFS period 923) that is above a predetermined noise threshold is determined to be a stylus 680 signal. The WFT/WFS process continues as a background process for as long as no finger, touch object, or stylus is detected; the system may be in a low power mode outside of the WFT/WFS sensing periods, resulting in low overall average power consumption when no finger or stylus is proximate to the screen.

In an alternative embodiment, the WFT (mutual capacitance) and WFS (coupled-charge) are utilized, as described above in conjunction with FIG. 6B. In another embodiment, there is no reduced duty cycle WFT/WFS mode, and after initialization, the touch screen controller 605 begins finger tracking as described below even with no finger or stylus present on the sense array 400.

Figure 10:
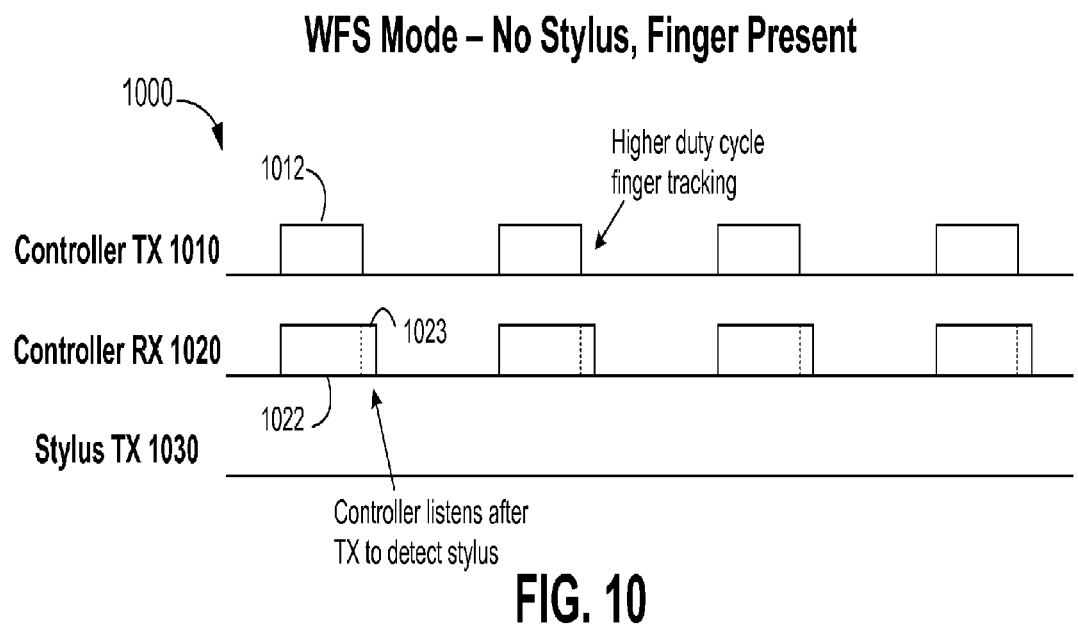
FIG. 10 is a timing diagram for a mutual capacitance touch screen system 950 where a finger is present on the touch screen, according to an embodiment of the invention.

FIG. 10 is a timing diagram 1000 for a mutual capacitance touch screen system 600 where a finger is present on the touch screen, according to an embodiment of the invention. The timing diagram 1000 illustrates a controller TX signal 1010, a controller RX signal 1020, and a stylus TX signal 1030. The controller TX signal 1010 includes controller TX pulse 1012. The controller RX signal 1020 includes WFT interval 1022, and WFS interval 1023.

In operation, a user places a finger on the touch screen. The touch screen controller 605 detects the finger during the WFT interval 912/922 and begins finger-tracking sensing. Finger tracking may include sending TX signals on some or all TX lines (rows) 635 of sense array 400 in sequence (1012), while RX sensing (1022) on some or all of RX lines (columns) 640, as previously described. In an embodiment, the scanning may be done periodically (e.g., at 10 ms intervals) or continuously (not shown). Once a finger is detected, the controller TX signal 1010 may increase the duty cycle of the controller TX pulses 1012, for example to improve the signal to noise ratio of the sensing operation. After the Mutual Capacitance Sensing (MCS) period 1022, the touch screen controller 605 performs a WFS operation during period 1023. In an embodiment, some or all of the columns and/or rows during the WFS interval 1023 are "ganged" or shorted together by the pin multiplexor 630 and the touch screen controller 605 scans the entire sense array 400 as a single sensor to detect for the presence (but not location) of stylus TX signals 677. Once the presence of the stylus 680 is detected, then the touch screen controller 605 locates and/or tracks the stylus as previously described. Alternatively, the rows and/or columns are not "ganged" during the WFS interval 1023. The WFS interval 1023 is typically shorter in duration (e.g. 100-200 μs) than MCS periods 1022. In an embodiment, the touch screen controller 605 performs the WFS sensing periodically, rather than after every WFT interval. For example, WFS may occur at every 100 ms or after every ten MCS scans.

Figure 11:
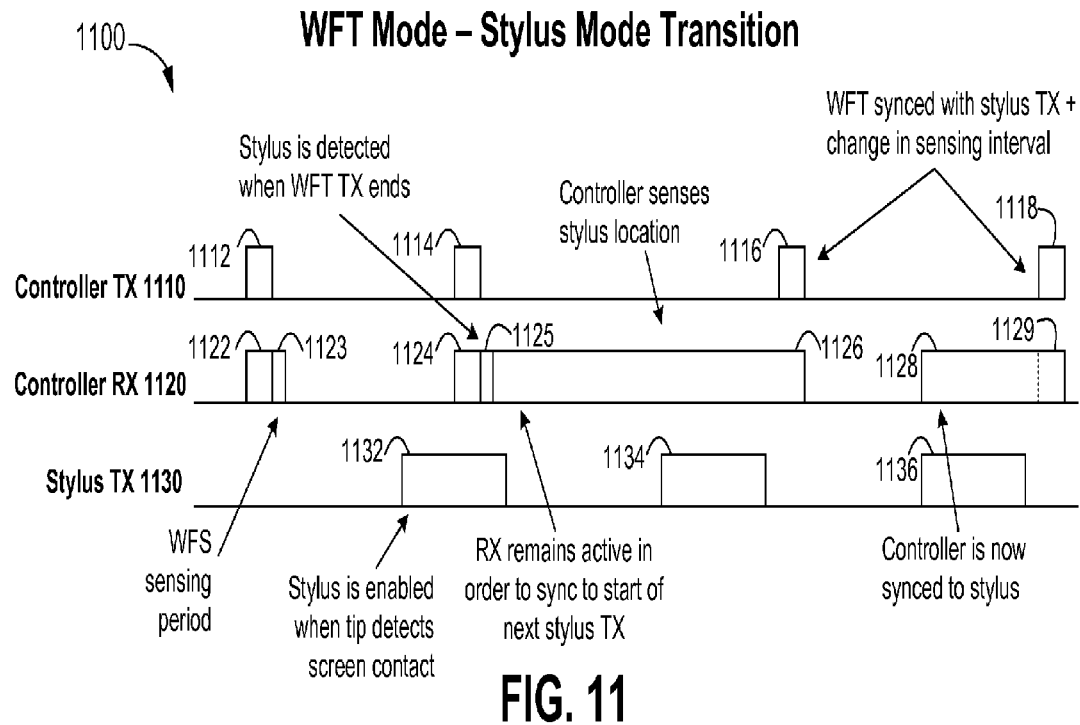
FIG. 11 is a timing diagram for a mutual capacitance touch screen system where a stylus is present on the touch screen, according to an embodiment of the invention.

FIG. 11 is a timing diagram 1100 for a mutual capacitance touch screen system 600 where a stylus 680 is present on the touch screen, according to an embodiment of the invention. It should be noted that the stylus appears at around 1132, but is not present initially. The timing diagram 1100 illustrates a controller TX signal 1110, a controller RX signal 1120, and a stylus TX signal 1130. The controller TX signal 1110 includes controller TX signaling periods 1112, 1114, 1116, and 1118. The controller RX signal 1120 includes WFT intervals 1122, 1124, and 1129. The controller RX signal 1120 further includes WFS intervals 1123 and 1125. The stylus TX signal 1130 includes stylus TX pulses 1132, 1134, and 1136.

In one embodiment (not shown), the stylus 680 transmits stylus TX signals 1130 continuously when transmitting. In another embodiment, the stylus 680 transmits a stylus TX signal 1130 at a certain duty cycle. For example, the stylus 680 transmits a stylus TX signal 1130 for 2 ms per every 10 ms. In another embodiment, the stylus 680 may transmit bursts on a duty cycle. For example, the stylus 680 transmits a stylus TX signal 1130 for 100 μs bursts with 50 μs gaps for a total of 4 ms, and then ceases transmission for six ms. Other duty cycles may be implemented as would be appreciated by one of ordinary skill in the art. In an embodiment, the duty cycle may change when the force sensor in the stylus tip 688 detects first contact with the touch screen. In another embodiment, the stylus 680 may not begin transmitting the TX signal 1130 until contact is detected. In each case, however, once the stylus 680 is in contact with the touch screen, it will begin transmitting—either at a predetermined duty cycle or burst pattern or continuously.

In an embodiment, the touch screen controller 605 senses the stylus TX signal 1130 and synchronizes RX sense timing to the stylus TX signal 1130 before RX sensing of the stylus signal begins. Typically, the stylus TX signal 1130 is easy to detect and synchronize with the touch screen controller 605 with a high-impedance RX sensing circuit (ITO is typically a high impedance material). In an embodiment with a relatively low impedance RX sensing circuit, it may be necessary to electrically disconnect the RX sensing circuit from the individual sensors on the sense array 400 in order for the stylus TX signal 1120 to be a high enough amplitude to be detected.

In an embodiment, a phase locked loop ("PLL") (not shown) may be used to detect and lock the RX sensing circuits of the touch screen controller 605 to the stylus TX signal 1120. Typically, the touch screen controller 605 performs the phase locking process at the beginning of each RX sensing operation in stylus mode (as shown in timing diagram 1100), and not just during WFS sensing. The PLL may be analog or digitally based. In an embodiment, the digital PLL is implemented in firmware.

In operation, the system 600 will initially be in WFT/WFS mode before the first touch from a touch object or stylus on the touch screen (e.g., WFT 1122 and WFS 1123). The active and enabled stylus 680 makes contact with the touch screen and transmits a TX signal during period 1132). In an embodiment, the touch screen controller 605 detects the stylus TX signal 1132 during WFS interval 1125. The controller RX signal 1120 then remains active (controller RX period 1126) to detect the next Stylus TX pulse 1134 to obtain sufficient timing information to synchronize the touch screen controller 605 to the stylus 680. By the end of controller RX period 1126, touch screen controller 605 establishes synchronization with the stylus TX signal 1130. Typically, synchronization will occur within two complete signal cycles. As shown, the controller RX signal 1128 begins at the start of the next stylus TX pulse 1136. In addition, the touch screen controller 605 synchronizes the controller TX WFT period 1118 to the stylus TX pulse 1136, which may change the WFT sensing rate. In another embodiment, the WFT signals (no finger detected) may be configured to occur before the synchronized stylus TX pulses. In either case, the WFT sensing is performed during a period when the stylus is known not to be sending stylus TX signals.

Although not shown in the timing diagrams, the stylus 680 may be configured to modulate the stylus TX signal 1130 to include additional data (e.g., force data, acceleration data, button data, power levels, etc.). Alternatively, the stylus 680 may be configured to send the additional data over a communication link as described herein.

In one embodiment, the touch screen controller 605 only senses the rows and columns in the vicinity of the last detected point of contact of the stylus to the touch screen. If the stylus is detected within that area, then the touch screen controller does not perform any further sensing outside of that vicinity. For example, the touch screen controller 605 may scan 12 rows and 12 columns centered on the row and column of the last detected location of the stylus, and continue to scan the 12 rows/columns around the last detected location of the stylus for as long as the stylus continues to be detected in that area; note that this area will move as the stylus moves, unless the stylus moves so fast as to move outside the area being sensing in a single scan rate interval. In another embodiment, the touch screen controller 605 determines the velocity and direction of the stylus based on the previous two or more scans to predict the current location of the stylus and centers the area of detection at the predicted location. In an embodiment, if both a stylus and finger are detected, as illustrated in FIG. 12, the entire screen may need to be scanned or separate location prediction algorithms may need to be applied to each input source to determine a reduced scanning area.

The presence of fingers on the touch screen may affect the stylus tracking accuracy. For example, fingers (touch objects) may couple TX signals from one row to another, or between rows and columns. Therefore, even if some embodiments do not support simultaneous tracking of both a stylus and a finger, it may advantageous to perform WFT sensing during stylus tracking in order to adjust for electrical changes induced by the presence of a finger.

Figure 12:
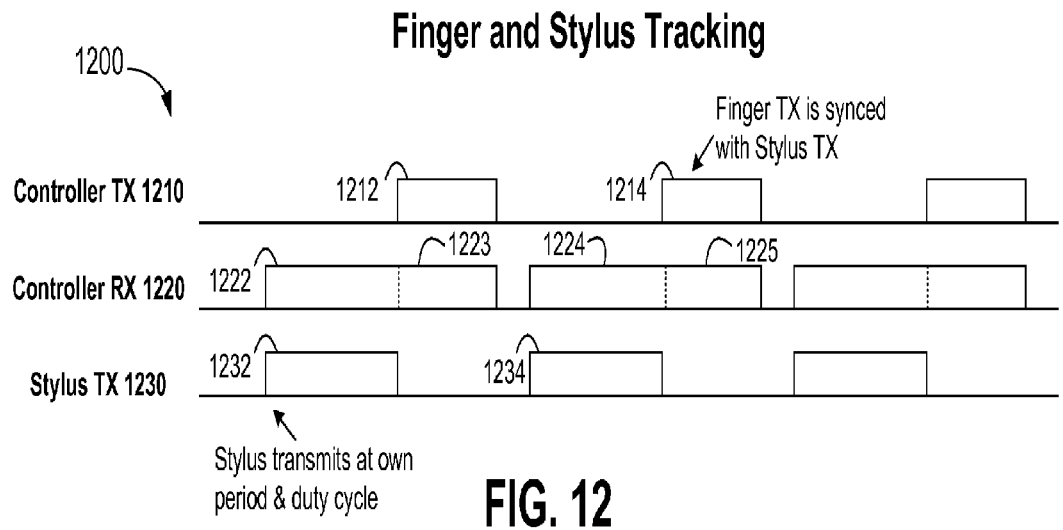
FIG. 12 is a timing diagram for a mutual capacitance touch screen system where a finger and a stylus are present on the touch screen, according to an embodiment of the invention.

FIG. 12 is a timing diagram 1200 for a mutual capacitance touch screen system 600 where a finger and a stylus 680 are simultaneously present on the touch screen, according to an embodiment of the invention. The timing diagram 1200 illustrates a controller TX signal 1210, a controller RX signal 1220, and a stylus TX signal 1230. The controller TX signal 1210 includes controller TX pulses 1212 and 1214. The controller RX signal 1220 includes MCS periods 1223 and 1225, and Stylus sensing (SS) periods 1222/1232 and 1224/1234. The stylus TX signal 1230 includes stylus TX signaling periods 1232 and 1234.

Timing diagram 1200 depicts substantially simultaneous tracking the position of a finger and stylus, according to an embodiment of the invention. As described above, the touch screen controller 605 synchronizes the timing of the controller TX signal 1210 to the stylus TX signal 1230 such that controller TX signal is not being transmitted when the stylus TX signal is active. For example, the MCS period 1222 is synchronized to the stylus TX period 1232. Furthermore, touch screen controller adjusts the controller TX period 1212 and MCS period 1223 to occur after the stylus TX pulse 1232 (and before the anticipated start of the following Stylus TX period 1234). As described above, stylus TX sensing may be faster than finger sensing. For example, a stylus TX pulse may occur every 10 ms for a duration of 3 ms. The remaining 7 ms are available to the touch screen controller to perform finger sensing/tracking.

When the stylus is removed from the touch screen, if the finger(s) remain in proximity with the touch screen, then the system 600 will continue finger tracking as described above in conjunction with FIG. 13. In an embodiment, the stylus may cease sending stylus TX signals when the stylus tip sensors no longer detect contact with the touch screen, after a predetermined timeout period, after a hand is no longer detected on the stylus, or when the stylus is turned off, as previously described. When neither finger nor stylus remains in contact with the touch screen, the system 600 begins executing WFT and WFS sensing at a reduced duty cycle, as previously described.

Figure 13:
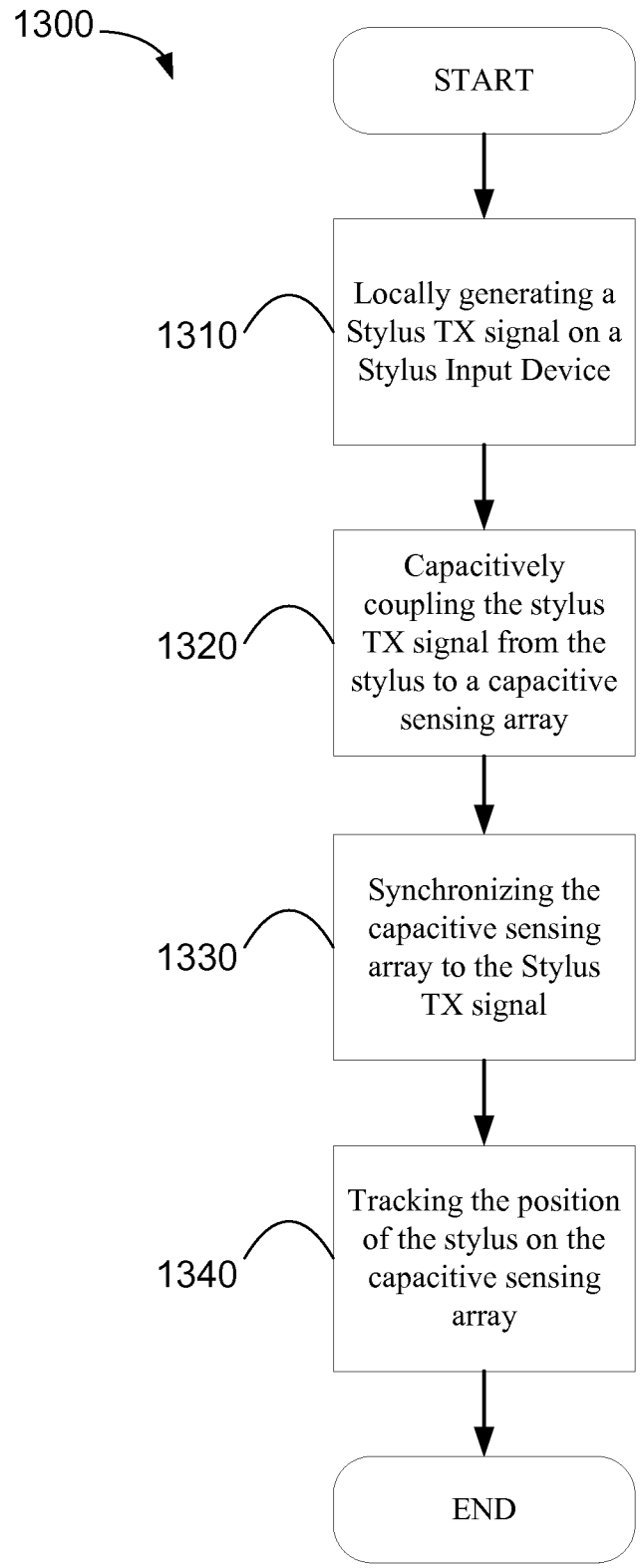
FIG. 13 is a flow chart of one embodiment of a method of detecting a stylus on a capacitive sense array.

FIG. 13 is a flow chart 1300 of one embodiment of a method of detecting a stylus 680 on a sense array 400. At block 1310, a stylus locally generates a stylus TX signal 677. In an embodiment, the stylus TX signal is generated by a waveform generator in the TX drive circuit 610. The stylus TX signal 677 may be modulated with additional data including force data, button data, power supply data, etc., as previously described.

The stylus 680 capacitively couples the stylus TX signal 677 to the sense array 400 (block 1320). A touch screen controller 605 synchronizes the sense array 400 to the stylus TX signal 677 (block 1330). The touch screen controller 605 tracks the position of the stylus 680 on the sense array 400 (block 1340). In an embodiment, the touch screen controller 605 is configured to substantially simultaneously track the position of the stylus 680 and another touch object (e.g., finger, palm, etc.).

Embodiments of the present invention, described herein, include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions. The computer-readable transmission medium includes, but is not limited to, electrical, optical, acoustical, or other form of propagated signal (e.g., carrier waves, infrared signals, digital signals, or the like), or another type of medium suitable for transmitting electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method comprising:
   receiving a first signal at a capacitance sensor from a stylus via capacitive coupling between the stylus and a capacitive sense array coupled to the capacitance sensor; and
   in response to the receiving of the first signal by the capacitance sensor, synchronizing a timing of the capacitance sensor to a timing of the first signal by adjusting the timing of the capacitance sensor using the timing of the first signal, wherein receive (RX) signals from the capacitive sense array remain active during the synchronizing of the timing of the capacitance sensor.

2. The method of claim 1, further comprising:
   detecting in a first sensing operation a location of the stylus on the capacitive sense array; and
   detecting in a second sensing operation a location of a passive touch object proximate to the capacitive sense array, wherein the second sensing operation comprises transmitting, by the capacitance sensor, to the capacitive sense array a second signal in response to the timing of the first signal.

3. The method of claim 2, further comprising initiating the second sensing operation in response to an end of the first sensing operation.

4. The method of claim 1, wherein receiving the first signal at the capacitance sensor from the stylus comprises receiving stylus tip force information.

5. The method of claim 1, wherein synchronizing the timing of the capacitance sensor to the timing of the first signal comprises:
   transmitting, by the capacitance sensor, to at least part of the capacitive sense array a transmit (TX) signal;
   receiving, by the capacitance sensor, a corresponding receive (RX) signal from the capacitive sense array;
   operating an RX sense circuit of the capacitance sensor; and
   receiving the first signal from the stylus using the RX sense circuit.

6. The method of claim 5, wherein synchronizing the timing of the capacitance sensor to the timing of the first signal comprises locking the RX sense circuit to the timing of the first signal using a phase locked loop (PLL).

7. The method of claim 5, wherein operating the RX sense circuit comprises configuring a multiplexor to couple an electrode of the capacitive sense array to the RX sense circuit.

8. The method of claim 5, wherein transmitting the TX signal comprises generating a signal having a different frequency from the frequency of the first signal, and transmitting the generated signal having a different frequency to the capacitive sense array.

9. An apparatus comprising:
   a capacitive sense array coupled to a capacitance sensor, the capacitance sensor comprising a receive (RX) sense circuit and a transmit (TX) drive circuit, the capacitance sensor configured to:
   detect a first signal from a stylus via capacitive coupling between the stylus and the capacitive sense array;
   synchronize a timing of the capacitance sensor to a timing of the first signal by adjusting the timing of the capacitance sensor using the timing of the first signal in response to the detection of the first signal by the capacitance sensor, wherein RX signals from the capacitive sense array remain on during the synchronization of the timing of the capacitance sensor;
   perform a first sensing operation to detect a location of the stylus on the capacitive sense array; and
   perform a second sensing operation to detect a location of a passive touch object proximate to the capacitive sense array.

10. The apparatus of claim 9, wherein the TX drive circuit is configured to transmit a second signal to at least part of the capacitive sense array in response to the timing of the first signal.

11. The apparatus of claim 9, wherein the capacitance sensor is further configured to receive stylus tip force information from the stylus.

12. The apparatus of claim 9, wherein the capacitance sensor is further configured to perform the second sensing operation in response to an end of the first sensing operation.

13. The apparatus of claim 9, wherein the capacitance sensor is further configured to:
    transmit a TX signal using the TX drive circuit;
    receive a corresponding RX signal using the RX sense circuit;
    continue to operate the RX sense circuit after the TX drive circuit has ceased transmitting the TX signal; and
    receive the first signal from the stylus using the RX sense circuit.

14. The apparatus of claim 13, wherein the TX drive circuit is further configured to transmit the TX signal having a frequency different from the frequency of the first signal.

15. The apparatus of claim 9 further comprising a phase locked loop (PLL) to synchronize operation of the capacitance sensor to the first signal.

16. The apparatus of claim 9 further comprising a multiplexor, configured to couple the TX drive circuit and the RX sense circuit to the capacitive sense array.

17. A method comprising:
    detecting a first signal at a capacitance sensor from a stylus via capacitive coupling between the stylus and a capacitive sense array coupled to the capacitance sensor;
    in response to detecting the first signal by the capacitance sensor, receiving the first signal and synchronizing the capacitance sensor to the first signal by adjusting a timing of the capacitance sensor, wherein RX signals from the capacitive sense array remain on during the synchronizing of the capacitance sensor;
    detecting in a first sensing operation a location of the stylus on the capacitive sense array; and detecting in a second sensing operation a location of a passive touch object proximate to the capacitive sense array, wherein the second sensing operation comprises transmitting, by the capacitance sensor, to the capacitive sense array a second signal in response to a timing of the first signal.

* * * * *